US012808474B2

(12) United States Patent
Matsui et al.

(10) Patent No.: US 12,808,474 B2
(45) Date of Patent: Nov. 24, 2026

(54) ROTARY JOINT

(71) Applicant: PILLAR CORPORATION, Osaka (JP)

(72) Inventors: Shuhei Matsui, Osaka (JP); Takayuki Iwasa, Osaka (JP)

(73) Assignee: PILLAR CORPORATION, Osaka (JP)

( * ) Notice: Subject to any disclaimer, the term of this patent is extended or adjusted under 35 U.S.C. 154(b) by 0 days.

(21) Appl. No.: 19/282,134

(22) Filed: Jul. 28, 2025

(65) Prior Publication Data

US 2026/0036231 A1 Feb. 5, 2026

(30) Foreign Application Priority Data

Jul. 31, 2024 (JP) ................................ 2024-124731

(51) Int. Cl.

| | |
|---|---|
| ***F16L 39/06*** | (2006.01) |
| ***F16L 27/06*** | (2006.01) |
| ***F16L 27/087*** | (2006.01) |
| ***F16L 39/04*** | (2006.01) |

(52) U.S. Cl.

CPC ............... *F16L 39/06* (2013.01); *F16L 39/04* (2013.01); *F16L 27/06* (2013.01); *F16L 27/087* (2013.01)

(58) Field of Classification Search

CPC . F16L 39/04; F16L 39/06; F16L 27/08; F16L 27/087; F16L 27/0828

See application file for complete search history.

(56) References Cited

U.S. PATENT DOCUMENTS

| | | | | |
|---|---|---|---|---|
| 2,343,491 | A * | 3/1944 | Breitenstein ............ | F16L 39/06 |
| 3,853,328 | A * | 12/1974 | Pierce ..................... | F16L 39/06 |
| 5,788,288 | A * | 8/1998 | Jostein .................... | F16L 39/06 |
| 7,083,200 | B2 * | 8/2006 | Falconer ............... | F16L 27/087 |
| 7,976,069 | B2 * | 7/2011 | Imai ........................ | F16L 39/06 |
| 8,613,472 | B2 * | 12/2013 | Ott ........................ | F16L 27/087 |
| 10,088,089 | B2 * | 10/2018 | Kikuyama .............. | F16L 39/04 |
| 10,655,741 | B2 * | 5/2020 | Suzuki .................... | F16L 39/06 |
| 10,663,097 | B2 * | 5/2020 | Uchikawa ............... | F16L 39/04 |
| 11,274,782 | B2 * | 3/2022 | Petrou ..................... | F16L 39/04 |
| 2002/0017785 | A1 * | 2/2002 | Omiya .................... | F16L 39/04 |
| 2022/0120366 | A1 | 4/2022 | Suzuki et al. | |

FOREIGN PATENT DOCUMENTS

| | | |
|---|---|---|
| JP | 2020106052 A | 7/2020 |

* cited by examiner

*Primary Examiner* — William S. Choi

(74) *Attorney, Agent, or Firm* — Osha Bergman Watanabe & Burton LLP

(57) ABSTRACT

A rotary joint includes a tubular case body, a shaft body, and a communication flow passage connecting an outer flow passage of the case body and an inner flow passage of the shaft body. The inner flow passage has a plurality of branch passage portions being open at positions different from each other in a circumferential direction, on the outer circumferential side of the shaft body, and a main passage portion extending in an axial direction from an end surface on one side in the axial direction of the shaft body toward another side in the axial direction and having a merging end portion where the plurality of branch passage portions merge, on the other side in the axial direction.

2 Claims, 12 Drawing Sheets

ROTARY JOINT

TECHNICAL FIELD

The present disclosure relates to a rotary joint. This application claims priority on Japanese Patent Application No. 2024-124731 filed on Jul. 31, 2024, the entire content of which is incorporated herein by reference.

BACKGROUND ART

A rotary joint is used for connecting a flow passage in a fixed-side member to a flow passage in a rotary-side member. For example, in a chemical mechanical polishing apparatus (CMP apparatus) used for performing surface polishing treatment of a semiconductor wafer, a polishing solution, air for pressurization, washing water, pure water, air for air blow, a polishing residue liquid, and the like flow as sealing target fluids between a rotary-side member (top ring) and a fixed-side member (CMP apparatus main body) that supports the rotary-side member. In order to allow such sealing target fluids to flow between the rotary-side member and the fixed-side member without mixing of these fluids, a joint portion that connects these members needs to be provided with a plurality of independent fluid passages. Thus, for example, a multi-port rotary joint disclosed in PATENT LITERATURE 1 is used as such a joint portion.

The rotary joint of PATENT LITERATURE 1 includes a tubular case body, a shaft body rotatably provided in the case body, and a plurality of mechanical seals provided between the case body and the shaft body so as to be aligned in the axial direction. In the case body, a plurality of outer flow passages are formed so as to penetrate the case body in the radial direction. Each outer flow passage is open at a predetermined location in the circumferential direction on the inner circumferential surface of the case body.

In the shaft body, inner flow passages (flow passage holes) whose number is equal to the number of outer flow passages are formed so as to be open on the outer circumferential side of the shaft body. Each inner flow passage is formed with an L-shaped cross-section by a vertical hole portion extending along the axial direction within the shaft body and a horizontal hole portion extending in the radial direction from an end portion of the vertical hole portion toward the outer circumferential surface of the shaft body. Therefore, each inner flow passage is open at a predetermined location in the circumferential direction on the outer circumferential surface of the shaft body. In the rotary joint, a plurality of communication flow passages that connect the openings of the respective outer flow passages on the inner circumferential surface of the case body and the openings of the respective inner flow passages on the outer circumferential surface of the shaft body are formed in the axial direction by the plurality of mechanical seals.

CITATION LIST

Patent Literature

PATENT LITERATURE 1: Japanese Laid-Open Patent Publication No. 2020-106052

SUMMARY OF THE INVENTION

Technical Problem

For a rotary joint used in a CMP apparatus, it is required to reduce the pressure loss of sealing target fluids flowing therein. However, in the above conventional rotary joint, when the shaft body rotates relative to the case body, the angle in the circumferential direction between the opening of each inner flow passage (horizontal hole portion) on the outer circumferential surface of the shaft body and the opening of each outer flow passage on the inner circumferential surface of the case body is at most 180°. When this angle reaches 180°, the distance by which the sealing target fluids flow in the circumferential direction in the communication flow passage between both openings becomes long, resulting in increased pressure loss of the sealing target fluids. Therefore, in the above conventional rotary joint, it is not possible to effectively reduce the pressure loss of the sealing target fluids.

The present disclosure has been made in view of such circumstances, and an object of the present disclosure is to provide a rotary joint that can effectively reduce the pressure loss of a sealing target fluid.

Solution to Problem (1) A rotary joint of the present disclosure includes: a tubular case body formed such that an outer flow passage through which a sealing target fluid flows is open on an inner circumferential side; a shaft body provided in the case body so as to be rotatable and formed such that an inner flow passage through which the sealing target fluid flows is open on an outer circumferential side; and a communication flow passage connecting the outer flow passage and the inner flow passage. The inner flow passage has a plurality of branch passage portions being open at positions different from each other in a circumferential direction, on the outer circumferential side of the shaft body, and a main passage portion extending in an axial direction from an end surface on one side in the axial direction of the shaft body toward another side in the axial direction and having a merging end portion where the plurality of branch passage portions merge, on the other side in the axial direction.

In the rotary joint of the present disclosure, the inner flow passage of the shaft body has the plurality of branch passage portions that are open at positions different from each other in the circumferential direction on the outer circumferential side of the shaft body. Accordingly, when the shaft body rotates relative to the case body, the angle in the circumferential direction between the opening closest in the circumferential direction from the opening of the outer flow passage on the inner circumferential side of the case body, among the plurality of openings of the inner flow passage (branch passage portion) on the outer circumferential side of the shaft body, and the opening of the outer flow passage is, at most, less than 180°. Therefore, the distance by which the sealing target fluid flows in the circumferential direction in the communication flow passage between the inner flow passage and the outer flow passage becomes shorter than in the conventional rotary joint, so that the pressure loss of the sealing target fluid due to the relative rotation of the shaft body can be reduced. Furthermore, in the inner flow passage, the plurality of branch passage portions merge with the merging end portion of the main passage portion, so that the flow passage resistance at the merging end portion can be reduced to be lower than the flow passage resistance at the bent portion having an L-shaped cross-section in the conventional inner flow passage. Due to the above, the pressure loss of the sealing target fluid can be reduced more effectively than in the conventional rotary joint.

(2) In the rotary joint of (1) above, preferably, the plurality of branch passage portions include an inclined branch passage portion extending in a direction that forms an acute angle with the axial direction toward the other side in the axial direction, from the merging end portion of the main passage portion to the outer circumferential side of the shaft body. In this case, the inclined branch passage portion merges more gently with the merging end portion of the main passage portion than the first branch passage portion (second branch passage portion) in (6) described later. Accordingly, the flow passage resistance at the merging end portion of the main passage portion is reduced, so that the pressure loss of the sealing target fluid can be further effectively reduced.

(3) In the rotary joint of (2) above, preferably, the plurality of branch passage portions include an extension branch passage portion having an extension portion extending in the axial direction from the merging end portion of the main passage portion toward the other side in the axial direction.

In this case, the angle between the inclined branch passage portion and the extension branch passage portion (extension portion) becomes acute and is smaller than the angle (180°) between the first branch passage portion and the second branch passage portion in (7) described later. Accordingly, the flow passage resistance at the merging end portion of the main passage portion where the inclined branch passage portion and the extension branch passage portion merge is reduced, so that the pressure loss of the sealing target fluid can be further effectively reduced.

(4) In the rotary joint of (3) above, preferably, the extension branch passage portion further has an inclined portion extending in a direction that forms an acute angle with the axial direction toward the other side in the axial direction, from an end portion on the other side in the axial direction of the extension portion to the outer circumferential side of the shaft body.

In this case, the extension branch passage portion is gently bent by the inclined portion extending in the direction that forms an acute angle with respect to the axial direction, from the end portion on the other side in the axial direction of the extension portion. Accordingly, the flow passage resistance of the extension branch passage portion is reduced compared to the case where the extension branch passage portion is bent perpendicularly in the radial direction from the end portion of the extension portion, so that the pressure loss of the sealing target fluid can be further effectively reduced.

(5) In the rotary joint of (3) or (4) above, preferably, the inclined branch passage portion and the extension branch passage portion are open so as to be spaced apart from each other by 180° in the circumferential direction, on the outer circumferential side of the shaft body.

In this case, the inclined branch passage portion and the extension branch passage portion (inclined portion) are open at an interval of 180° in the circumferential direction on the outer circumferential side of the shaft body. Accordingly, when the shaft body rotates relative to the case body, the angle in the circumferential direction between the opening closer in the circumferential direction from the opening of the outer flow passage on the inner circumferential side of the case body, of the two openings of the inclined branch passage portion and the extension branch passage portion on the outer circumferential side of the shaft body, and the opening of the outer flow passage is at most 90°. Therefore, the distance by which the sealing target fluid flows in the circumferential direction in the communication flow passage between the inner flow passage and the outer flow passage is further shortened, so that the pressure loss of the sealing target fluid due to the relative rotation of the shaft body can be further reduced.

(6) In the rotary joint of any one of (1) to (5) above, preferably, the plurality of branch passage portions include a first branch passage portion and a second branch passage portion extending radially outward of the shaft body from the merging end portion of the main passage portion to the outer circumferential side of the shaft body.

In this case, the first branch passage portion and the second branch passage portion of the inner flow passage are formed in the radial direction so as to be perpendicular to the main passage portion extending in the axial direction, so that the first branch passage portion and the second branch passage portion can be formed more easily than the inclined branch passage portion in (2) above.

(7) In the rotary joint of (6) above, preferably, the first branch passage portion and the second branch passage portion are open so as to be spaced apart from each other by 180° in the circumferential direction, on the outer circumferential side of the shaft body.

In this case, the first branch passage portion and the second branch passage portion of the inner flow passage are open at an interval of 180° in the circumferential direction, on the outer circumferential side of the shaft body. Accordingly, when the shaft body rotates relative to the case body, the angle in the circumferential direction between the opening closest in the circumferential direction from the opening of the outer flow passage on the inner circumferential side of the case body, of the two openings of the first branch passage portion and the second branch passage portion on the outer circumferential side of the shaft body, and the opening of the outer flow passage is at most 90°. Therefore, the distance by which the sealing target fluid flows in the circumferential direction in the communication flow passage between the inner flow passage and the outer flow passage becomes shorter than in the conventional rotary joint, so that the pressure loss of the sealing target fluid due to the rotation of the shaft body can be further reduced.

Advantageous Effects of the Invention

With the rotary joint of the present disclosure, the pressure loss of the sealing target fluid can be effectively reduced.

DETAILED DESCRIPTION

Next, preferred embodiments will be described with reference to the accompanying drawings.

First Embodiment

<Entire Configuration>

Figure 1:
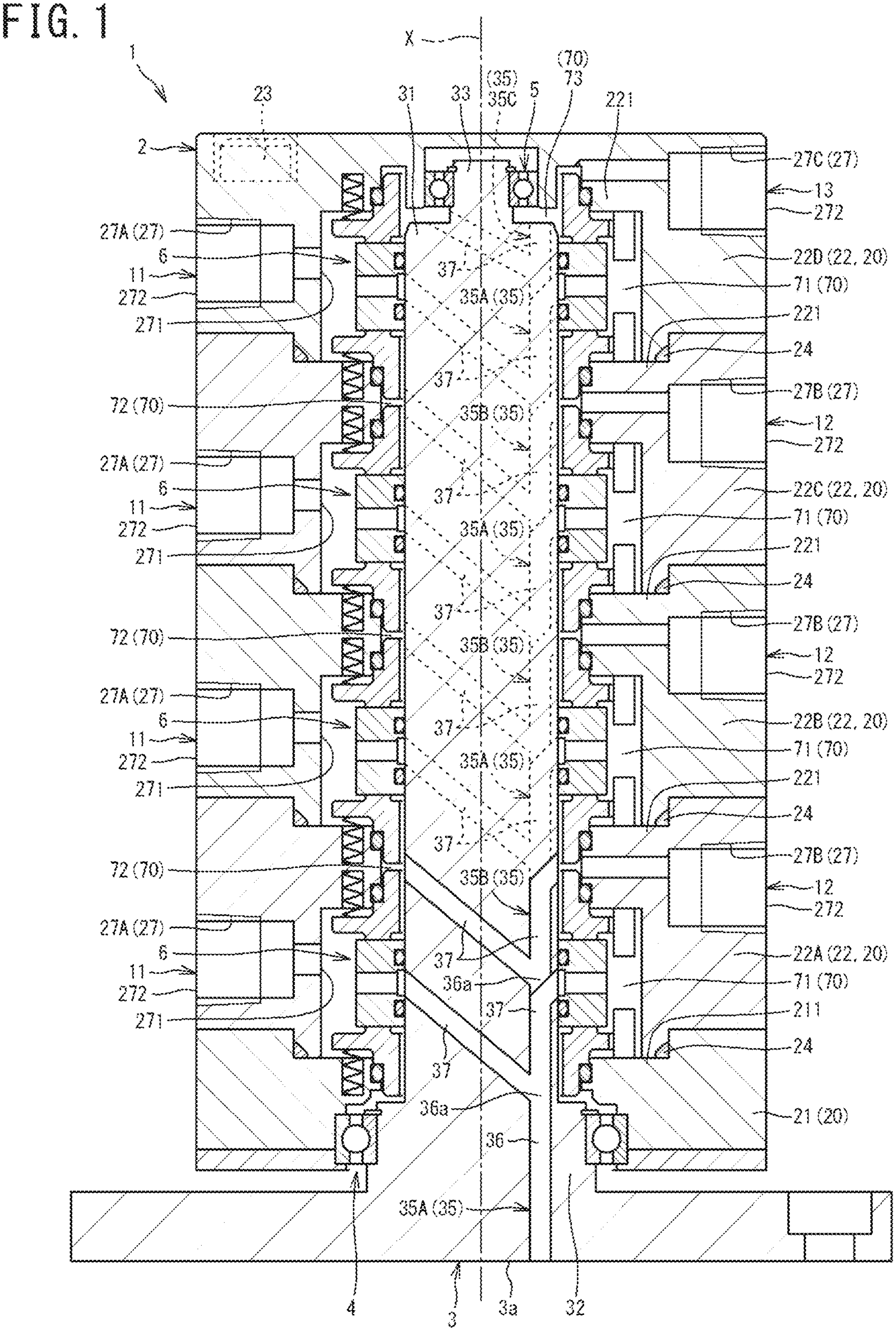
FIG. 1 is a cross-sectional view showing a rotary joint according to a first embodiment of the present disclosure.

FIG. 1 is a cross-sectional view showing a rotary joint 1 according to a first embodiment. The rotary joint 1 includes a tubular case body 2 and a cylindrical shaft body 3. The case body 2 is mounted on a fixed-side member of a rotary machine (e.g., a CMP apparatus main body). The shaft body 3 is mounted on a rotary-side member of the rotary machine (e.g., a top ring of the CMP apparatus). The case body 2 and the shaft body 3 of the present embodiment are placed such that the axial direction is the up-down direction.

In the present disclosure, the "axial direction" is a direction along a center line X of the rotary joint 1 (including a direction parallel to the center line X). In addition, in the present disclosure, the "radial direction" is a direction orthogonal to the center line X of the rotary joint 1, and the "circumferential direction" is a direction around the center line X of the rotary joint 1. The orientation of the rotary joint 1 may be an orientation different from that shown in FIG. 1. In the present disclosure, for convenience of description, the lower side in the axial direction (one side in the axial direction) shown in FIG. 1 is referred to as "lower side" of the rotary joint 1, and the upper side in the axial direction (another side in the axial direction) shown in FIG. 1 is referred to as "upper side" of the rotary joint 1.

<Case Body>

The case body 2 includes a plurality of flanges 20 stacked in the axial direction. The plurality of flanges 20 include an annular support flange 21 and a plurality of flow passage flanges 22. The plurality of flow passage flanges 22 are composed of a first flow passage flange 22A, a second flow passage flange 22B, a third flow passage flange 22C, and a fourth flow passage flange 22D that are stacked in this order from the lower side. The first flow passage flange 22A, the second flow passage flange 22B, and the third flow passage flange 22C are each formed in a ring shape. The fourth flow passage flange 22D is formed in a recessed ring shape that is open downward.

The support flange 21 has an annular protrusion 211 that protrudes radially inward. Each flow passage flange 22 has an annular protrusion 221 that protrudes radially inward at an upper portion thereof. The support flange 21 and the plurality of flow passage flanges 22 are fixed by a plurality of bolts 23 (only one is shown in FIG. 1) in a state where the support flange 21 and the plurality of flow passage flanges 22 are stacked as described above. Accordingly, the case body 2 is formed in a cylindrical shape with a top as a whole. The spaces between the flanges 20 adjacent to each other in the up-down direction are sealed by O-rings 24.

<Outer Flow Passages>

A plurality of outer flow passages 27 that are holes through which a sealing target fluid flows are formed in the case body 2. The plurality of outer flow passages 27 include a plurality of first outer flow passages 27A, a plurality of second outer flow passages 27B, and a third outer flow passage 27C. The case body 2 of the present embodiment includes a total of eight outer flow passages 27 including four first outer flow passages 27A, three second outer flow passages 27B, and one third outer flow passage 27C. The first outer flow passages 27A and the second outer flow passages 27B are formed alternately at predetermined intervals in the axial direction. The third outer flow passage 27C is formed in the uppermost portion of the case body 2.

Each first outer flow passage 27A is formed at a predetermined location in the circumferential direction in a lower portion (portion other than the protrusion 221) of each flow passage flange 22 so as to penetrate the flow passage flange 22 in the radial direction. Each second outer flow passage 27B is formed at a predetermined location in the circumferential direction in an upper portion (protrusion 221) of each flow passage flange 22 other than the fourth flow passage flange 22D so as to penetrate the flow passage flange 22 in the radial direction. The third outer flow passage 27C is formed at a predetermined location in the circumferential direction in an upper portion (protrusion 221) of the fourth flow passage flange 22D so as to penetrate the fourth flow passage flange 22D in the radial direction. Examples of the sealing target fluid include fluids such as a polishing solution, air for pressurization, inert gases such as nitrogen, washing water, pure water, air for air blow, and a polishing residue liquid.

Each outer flow passage 27 is open on the inner circumferential surface of the flow passage flange 22 which is the inner circumferential side of the flow passage flange 22. An opening 271 (see also FIG. 2) on the inner circumferential side of the outer flow passage 27 communicates with a communication flow passage 70 described later. The center of the opening 271 of each first outer flow passage 27A coincides with the hole center of the first outer flow passage 27A in order to reduce the pressure loss of the sealing target fluid. In addition, the diameter of the opening 271 of the first outer flow passage 27A is larger than the hole diameter of a through hole 71*b* of a first communication flow passage 71 described later, in order to reduce the pressure loss of the sealing target fluid. The outer flow passage 27 is open on the outer circumferential surface of the flow passage flange 22 which is the outer circumferential side of the flow passage flange 22. Openings 272 on the outer circumferential side of the outer flow passages 27 are configured as connection ports to which a plurality of pipes of the fixed-side member are respectively connected.

<Shaft Body>

The shaft body 3 is provided in the case body 2. The shaft body 3 includes a shaft main body portion 31 that extends in the up-down direction, a large-diameter portion 32 that is provided at a lower end portion of the shaft main body portion 31, and a small-diameter portion 33 that is provided at an upper end portion of the shaft main body portion 31. The outer diameter of the large-diameter portion 32 is larger than the outer diameter of the shaft main body portion 31. The outer diameter of the small-diameter portion 33 is smaller than the outer diameter of the shaft main body portion 31.

A rolling bearing 4 is provided between the large-diameter portion 32 of the shaft body 3 and the support flange 21. A rolling bearing 5 is provided between the small-diameter portion 33 of the shaft body 3 and the fourth flow passage flange 22D. Accordingly, the shaft body 3 is supported so as to be rotatable relative to the case body 2 about the center line X.

<Inner Flow Passages>

In the shaft body 3, a plurality of inner flow passages 35 that are holes through which the sealing target fluid flows are formed. Each inner flow passage 35 is formed with a circular cross-section, for example. The plurality of inner flow passages 35 are formed in the shaft body 3 so as to be spaced apart from each other in the circumferential direction. In FIG. 1, for convenience, the plurality of inner flow passages 35 are shown collectively at one location in the circumferential direction. Ends of the plurality of inner flow passages 35 are open at different positions in the circumferential direction on an end surface 3*a* on the lower side of the shaft body 3. The other ends of the plurality of inner flow passages 35 are open at positions different from each other in the axial direction on the outer circumferential side of the shaft body 3.

The plurality of inner flow passages 35 include a plurality of first inner flow passages 35A, a plurality of second inner flow passages 35B, and a third inner flow passage 35C. The shaft body 3 of the present embodiment includes a total of eight inner flow passages 35 including four first inner flow passages 35A, three second inner flow passages 35B, and one third inner flow passage 35C.

Each of the plurality of first inner flow passages 35A is open at the same position in the axial direction as the opening 271 of each first outer flow passage 27A on the inner circumferential side of the case body 2, on the outer circumferential surface of the shaft body 3 which is the outer circumferential side of the shaft body 3. Each of the plurality of second inner flow passages 35B is open at the same position in the axial direction as the opening 271 (see FIG. 2) of each second outer flow passage 27B on the inner circumferential side of the case body 2, on the outer circumferential surface of the shaft body 3 which is the outer circumferential side of the shaft body 3. The third inner flow passage 35C is open on an end surface 31*a* (see FIG. 3) on the upper side of the shaft main body portion 31 on the outer circumferential side of the shaft body 3.

Each inner flow passage 35 has a main passage portion 36 and a plurality of (two in FIG. 1) branch passage portions 37. The main passage portion 36 extends straight in the axial direction from the end surface 3*a* on the lower side (one side in the axial direction) of the shaft body 3 toward the upper side (other side in the axial direction). The main passage portion 36 is open on the end surface 3*a* on the lower side of the shaft body 3. A pipe of the rotary-side member is connected to the opening on the lower side of the main passage portion 36. A passage end portion on the upper side of the main passage portion 36 is formed as a merging end portion 36*a* where a plurality of branch passage portions 37 merge. The merging end portion 36*a* of the main passage portion 36 is located slightly lower in the axial direction than the opening 271 of the corresponding outer flow passage 27.

<Branch Passage Portions>

Figure 2:
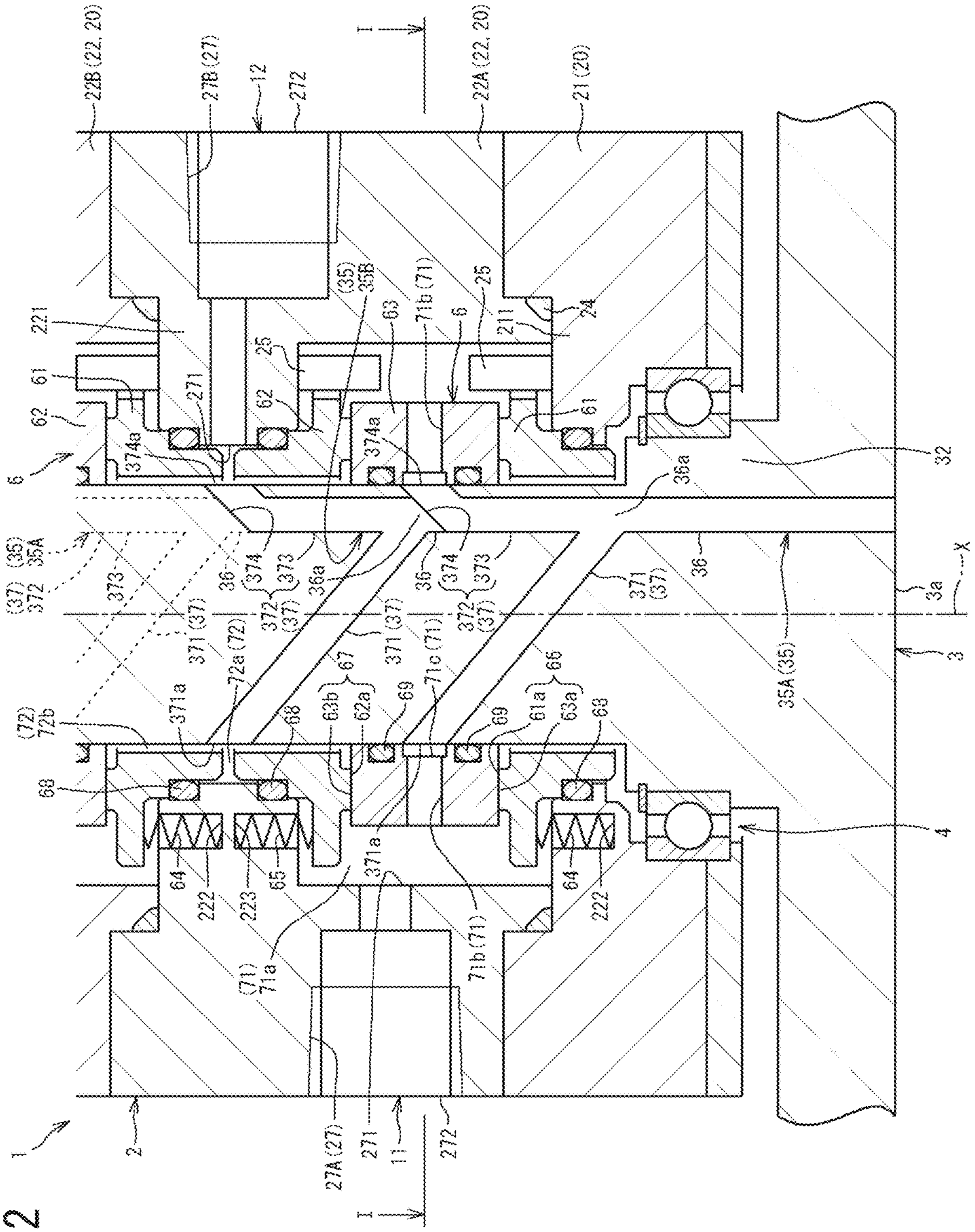
FIG. 2 is an enlarged cross-sectional view showing the lower side of the rotary joint.

FIG. 2 is an enlarged cross-sectional view showing the lower side of the rotary joint 1. In FIG. 2, the two branch passage portions 37 of the inner flow passage 35 are open at positions different from each other in the circumferential direction, on the outer circumferential side of the shaft body 3, and merge with the merging end portion 36*a* of the main passage portion 36. The two branch passage portions 37 of the present embodiment include an inclined branch passage portion 371 and an extension branch passage portion 372. Each of the inclined branch passage portion 371 and the extension branch passage portion 372 has the same flow passage cross-sectional area as the main passage portion 36. At least one of the inclined branch passage portion 371 and the extension branch passage portion 372 may have a flow passage cross-sectional area different from that of the main passage portion 36.

The inclined branch passage portion 371 extends obliquely in a direction that forms an acute angle with the axial direction toward the upper side (in FIG. 2, obliquely upward to the left) from the merging end portion 36*a* of the main passage portion 36 to the outer circumferential side of the shaft body 3. The inclined branch passage portion 371 of the present embodiment is inclined upward at about 50° with respect to the axial direction from the merging end portion 36*a* of the main passage portion 36. Accordingly, the inclined branch passage portion 371 merges more gently with the merging end portion 36*a* of the main passage portion 36 than a first branch passage portion 376 (second branch passage portion 377) of a second embodiment (FIG. 7) described later.

Each inclined branch passage portion 371 of the first inner flow passages 35A and the second inner flow passages 35B is open on the outer circumferential surface of the shaft body 3 which is the outer circumferential side of the shaft body 3, and an opening 371*a* thereof is located at the same position in the axial direction as the opening 271 of the corresponding outer flow passage 27.

Each extension branch passage portion 372 of the first inner flow passages 35A and the second inner flow passages 35B has an extension portion 373 and an inclined portion 374. The extension portion 373 is a portion that extends straight in the axial direction from the merging end portion 36*a* of the main passage portion 36 toward the upper side. Therefore, the angle between the inclined branch passage portion 371 and the extension branch passage portion 372 (extension portion 373) is an acute angle. Accordingly, each of the first inner flow passages 35A and the second inner flow passages 35B of the present embodiment is formed in a substantially Y-shape in a cross-sectional view in the axial direction (FIG. 2). The extension portion 373 extends to a position closer in the axial direction to the opening 271 of the corresponding outer flow passage 27 from the lower side.

The inclined portion 374 of the extension branch passage portion 372 extends obliquely in a direction that forms an acute angle with the axial direction toward the upper side (in FIG. 2, obliquely upward to the right) from an end portion on the upper side of the extension portion 373 to the outer circumferential surface of the shaft body 3. The inclined portion 374 of the present embodiment is inclined upward at about 45° with respect to the axial direction from the end portion of the extension portion 373. Accordingly, the extension branch passage portion 372 is gently bent by the inclined portion 374 from the end portion of the extension portion 373 and is open on the outer circumferential surface of the shaft body 3.

An opening 374*a* of the inclined portion 374 on the outer circumferential surface of the shaft body 3 is located at the same position in the axial direction as the opening 271 of the corresponding outer flow passage 27. Therefore, on the outer circumferential surface of the shaft body 3, the inclined portion 374 is open at the same position in the axial direction as the inclined branch passage portion 371. The opening 374*a* of the inclined portion 374 communicates with a corresponding first communication flow passage 71 (described later) or second communication flow passage 72 (described later).

Figure 3:
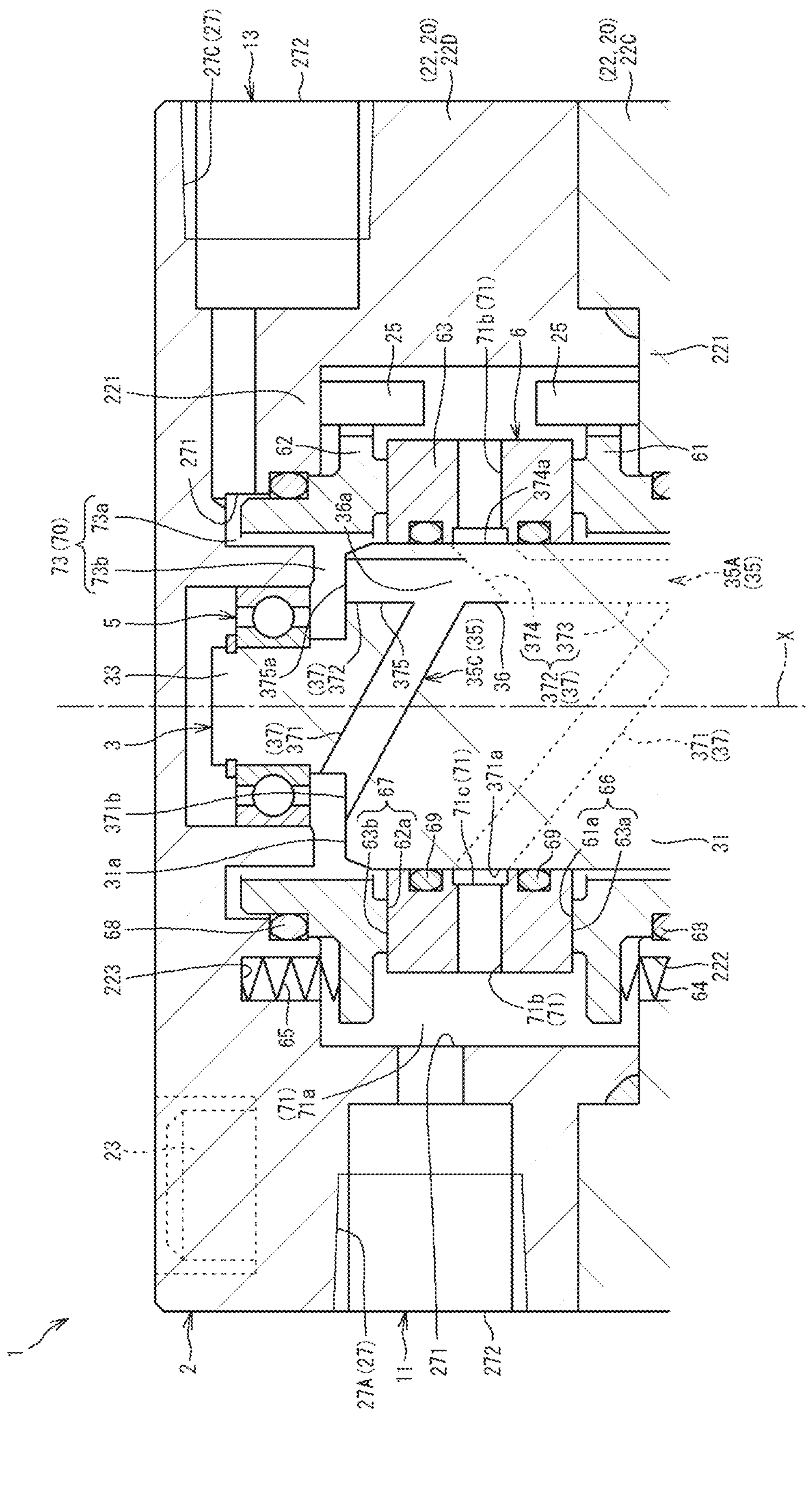
FIG. 3 is an enlarged cross-sectional view showing the upper side of the rotary joint.

FIG. 3 is an enlarged cross-sectional view showing the upper side of the rotary joint 1. In FIG. 3, the inclined branch passage portion 371 of the third inner flow passage 35C is open at a corner portion between the shaft main body portion 31 and the small-diameter portion 33 on the outer circumferential side of the shaft body 31, and an opening 371*b* thereof communicates with a third communication flow passage 73 described later.

The extension branch passage portion 372 of the third inner flow passage 35C has an extension portion 375 only. The extension portion 375 extends straight in the axial direction from the merging end portion 36*a* of the main passage portion 36 toward the upper side. The angle between the inclined branch passage portion 371 and the extension branch passage portion 372 (extension portion 375) is an acute angle. Accordingly, the third inner flow passage 35C of the present embodiment is formed in a substantially Y-shape in a cross-sectional view in the axial direction (FIG. 3). The extension portion 375 is open on the end surface 31*a* on the upper side of the shaft main body portion 31 on the outer circumferential side of the shaft body 3, and an opening 375*a* thereof communicates with the third communication flow passage 73 described later.

Figure 4:
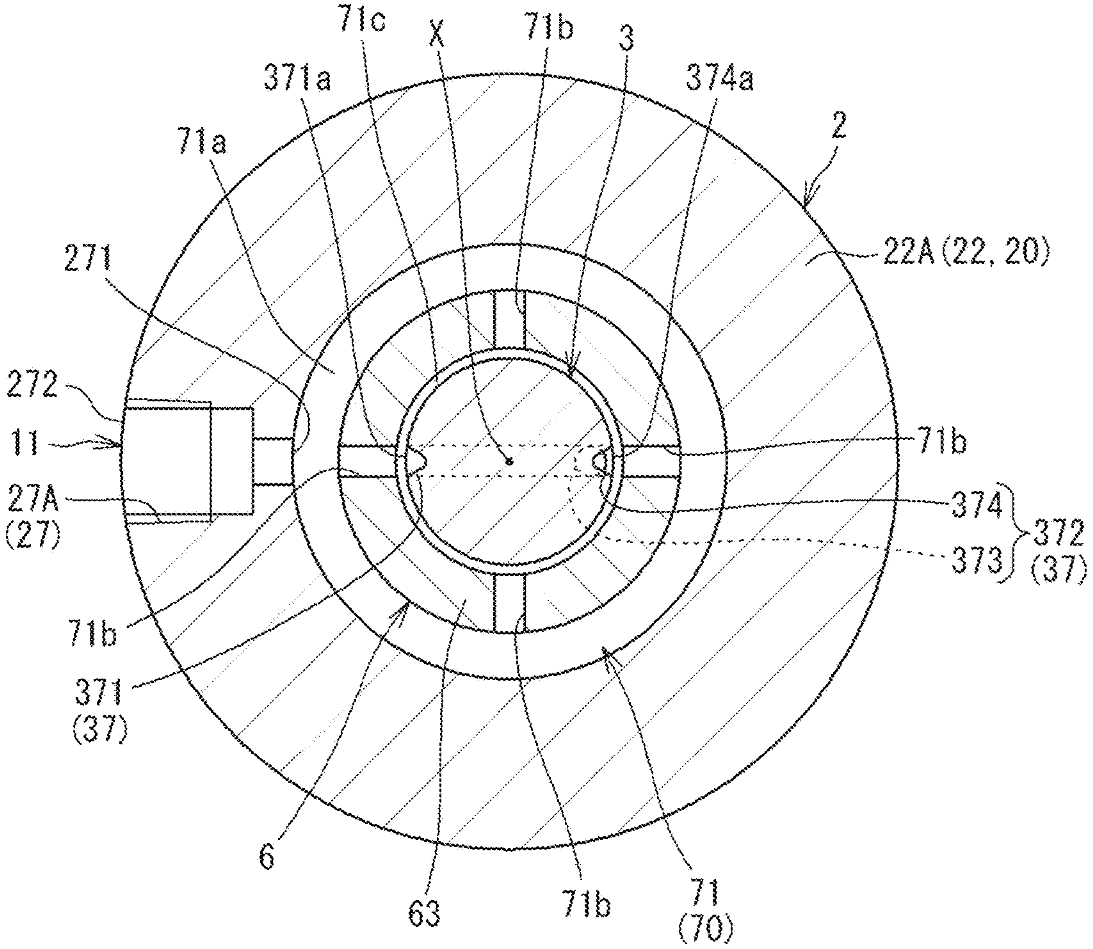
FIG. 4 is a cross-sectional view as seen in the direction of arrows I-I in FIG. 2.

FIG. 4 is a cross-sectional view as seen in the direction of arrows I-I in FIG. 2. In FIG. 2 and FIG. 4, the inclined branch passage portion 371 and the extension branch passage portion 372 (inclined portion 374) that are the branch passage portions 37 of each of the first inner flow passages 35A and the second inner flow passages 35B are open on the outer circumferential surface of the shaft body 3 so as to be spaced apart from each other in the circumferential direction. The inclined branch passage portion 371 and the extension branch passage portion 372 of the present embodiment are open so as to be spaced apart from each other by 180° in the circumferential direction.

The inclined branch passage portion 371 and the extension branch passage portion 372 (extension portion 375) that are the branch passage portions 37 of the third inner flow passage 35C (see FIG. 3) are open on the outer circumferential side of the shaft body 3 so as to be spaced apart from each other in the circumferential direction. The inclined branch passage portion 371 and the extension branch passage portion 372 of the third inner flow passage 35C of the present embodiment are open so as to be spaced apart from each other by 180° in the circumferential direction, on the outer circumferential side of the shaft body 3.

When the shaft body 3 rotates relative to the case body 2, the plurality of openings 371*a*, 374*a*, and 375*a* of the branch passage portions 37 on the outer circumferential surface of the shaft body 3 rotate together with the shaft body 3. Therefore, an angle α1 (see FIG. 5) in the circumferential direction between the opening 371*a* of the inclined branch passage portion 371 out of the branch passage portions 37 and the opening 271 of the outer flow passage 27 on the inner circumferential surface of the case body 2 changes as the shaft body 3 rotates. Similarly, an angle α2 (see FIG. 5) in the circumferential direction between the opening 374*a* (opening 375*a*) of the extension branch passage portion 372 out of the branch passage portions 37 and the opening 271 of the outer flow passage 27 on the inner circumferential surface of the case body 2 changes as the shaft body 3 rotates. The details thereof will be described below with reference to FIG. 4 and FIG. 5.

Figure 5:
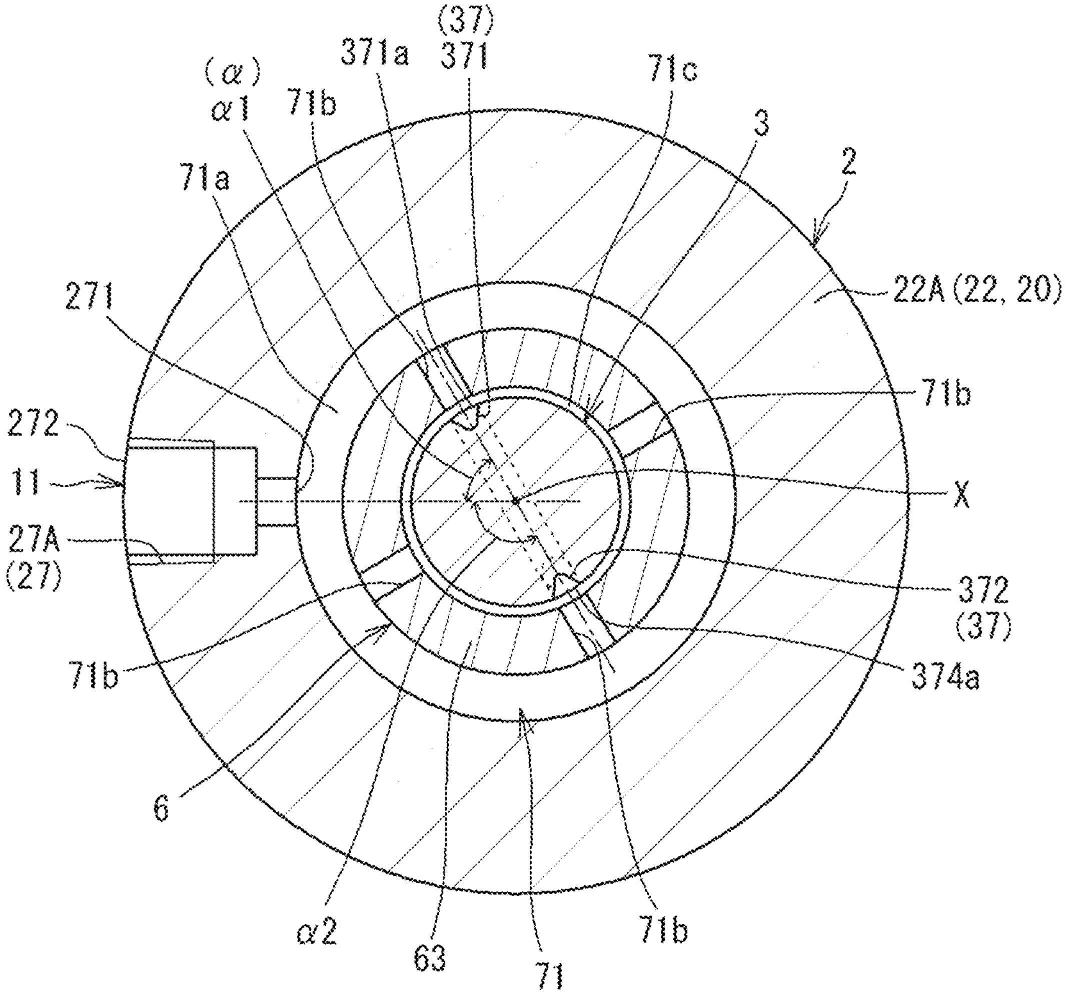
FIG. 5 illustrates angles related to branch passage portions of a first inner flow passage (second inner flow passage) in FIG. 4.

FIG. 5 illustrates the angles α1 and α2 related to the branch passage portions 37 of the first inner flow passage 35A (second inner flow passage 35B) in FIG. 4. The angles α1 and α2 related to the branch passage portions 37 of the third inner flow passage 35C (see FIG. 3) are the same, and thus the description thereof is omitted.

As shown in FIG. 5, the angle α1 is the angle in the circumferential direction between the center of the opening 371*a* of the inclined branch passage portion 371 and the center of the opening 271 of the outer flow passage 27, which is centered on the center line X of the rotary joint 1. The angle α2 is the angle in the circumferential direction between the center of the opening 374*a* of the extension branch passage portion 372 and the center of the opening 271 of the outer flow passage 27, which is centered on the center line X of the rotary joint 1.

The angle α1 changes such that the angle α1 reaches its maximum at the position where the opening 371*a* of the inclined branch passage portion 371 is rotated by 180° with respect to the opening 271 of the outer flow passage 27 (at the 3 o'clock position in FIG. 5). Similarly, the angle α2 changes such that the angle α2 reaches its maximum at the position where the opening 374*a* of the extension branch passage portion 372 is rotated by 180° with respect to the opening 271 of the outer flow passage 27 (at the 3 o'clock position in FIG. 5). Therefore, the angles α1 and α2, which change as the shaft body 3 rotates, are at most 180°.

The opening 371*a* of the inclined branch passage portion 371 and the opening 374*a* of the extension branch passage portion 372 are formed at an interval (phase difference) of 180° in the circumferential direction on the outer circumferential surface of the shaft body 3 as described above. Therefore, when the angle α1 is 90°, the angle α2 is also 90°. Furthermore, as shown in FIG. 5, when one of the angles α1 and α2 exceeds 90°, the other angle is less than 90°. Therefore, during rotation of the shaft body 3, one of the angles α1 and α2 is always 90° or less.

Due to the above, when the shaft body 3 rotates relative to the case body 2, the angle α between the opening closest in the circumferential direction from the opening 271 of the outer flow passage 27 (in FIG. 5, the opening 371*a*), among the plurality of openings 371*a* and 374*a* of the branch passage portions 37, and the opening 271 of the outer flow passage 27 is at most 90°.

In contrast, in the conventional rotary joint, as described above, the angle in the circumferential direction between the opening of each inner flow passage (horizontal hole portion) on the outer circumferential surface of the shaft body and the opening of each outer flow passage on the inner circumferential surface of the case body increases up to a maximum of 180°.

Therefore, the maximum value of the angle α of the present embodiment is smaller than that of the conventional rotary joint. Accordingly, in the present embodiment, the distance by which the sealing target fluid flows in the circumferential direction in the communication flow passage 70 (described later) that provides communication between the inner flow passage 35 and the outer flow passage 27 can be made shorter than in the conventional rotary joint.

<Mechanical Seals>

In FIG. 1, the rotary joint 1 includes a plurality of (four in FIG. 1) mechanical seals 6 placed between the case body 2 and the shaft body 3. The plurality of mechanical seals 6 are placed so as to be aligned in the axial direction between the case body 2 and the shaft body 3. Each mechanical seal 6 is placed on the inner circumferential side of two flanges 20 adjacent to each other in the up-down direction of the case body 2. Hereinafter, of these two flanges 20, the flange 20 placed on the upper side is referred to as "upper flange 20", and the flange 20 placed on the lower side is referred to as "lower flange 20".

In FIG. 2, each mechanical seal 6 has a first case-side sealing ring 61, a second case-side sealing ring 62, and a shaft-side sealing ring 63. The first case-side sealing ring 61 and the second case-side sealing ring 62 are case-side sealing rings provided on the inner circumferential side of the case body 2. The shaft-side sealing ring 63 is provided on the outer circumferential side of the shaft body 3 so as to be rotatable integrally with the shaft body 3. In the present embodiment, the case-side sealing rings 61 and 62 function as stationary sealing rings. The shaft-side sealing ring 63 functions as a rotary sealing ring that slides relative to the case-side sealing rings 61 and 62.

The first case-side sealing ring 61 and the second case-side sealing ring 62 are placed above and below the shaft-side sealing ring 63. Each of the first case-side sealing ring 61 and the second case-side sealing ring 62 is placed so as to oppose the shaft-side sealing ring 63 in the axial direction. Each of the first case-side sealing ring 61 and the second case-side sealing ring 62 is formed in a circular ring shape.

The first case-side sealing ring 61 is mounted on the lower flange 20 (support flange 21 in FIG. 2). Specifically, the first case-side sealing ring 61 is fitted on the inner circumferential side of the protrusion 211 (221) of the lower flange 20. A sealing surface 61*a* is formed on the end surface on the upper side of the first case-side sealing ring 61.

The second case-side sealing ring 62 is mounted on the upper flange 20 (first flow passage flange 22A in FIG. 2) of the flanges 20 adjacent to each other in the up-down direction of the case body 2. Specifically, the second case-side sealing ring 62 is fitted on the inner circumferential side of the protrusion 221 of the upper flange 20. A sealing surface 62*a* is formed on the end surface on the lower side of the second case-side sealing ring 62.

A radially outer portion of each case-side sealing ring 61 or 62 is in contact with a pin 25 that is fixed to the protrusion 221 of the flange 20 so as to protrude in the axial direction (up-down direction). Accordingly, each case-side sealing ring 61 or 62 is prevented from rotating relative to the case body 2 and restricted from rotating together with the shaft-side sealing ring 63. The spaces between the respective case-side sealing rings 61 and 62 and the protrusions 221 of the flanges 20 are sealed by O-rings 68.

The shaft-side sealing ring 63 is formed in a circular ring shape. The shaft-side sealing ring 63 is fitted to the outer circumferential surface of the shaft body 3 at the same position in the axial direction as the openings 371*a* and 374*a* on the outer circumferential side of the first inner flow passage 35A. An annular sealing surface 63*a* that contacts with the sealing surface 61*a* of the first case-side sealing ring 61 is formed on the end surface on the lower side of the shaft-side sealing ring 63. An annular sealing surface 63*b* that contacts with the sealing surface 62*a* of the second case-side sealing ring 62 is formed on the end surface on the upper side of the shaft-side sealing ring 63. The space between the inner circumferential surface of the shaft-side sealing ring 63 and the outer circumferential surface of the shaft body 3 is sealed by a pair of upper and lower O-rings 69 placed with an inner annular passage 71*c* (described later) located therebetween.

Each mechanical seal 6 has a first elastic member 64 and a second elastic member 65. The first elastic member 64 and the second elastic member 65 are, for example, compression coil springs. The first elastic member 64 is mounted on the lower flange 20. The second elastic member 65 is mounted on the upper flange 20. The first elastic member 64 and the second elastic member 65 are not limited to compression coil springs and may be other elastic members.

The first elastic member 64 is inserted into each of a plurality of insertion holes 222 (only one is shown in FIG. 2), which are formed in the circumferential direction in the protrusion 221 of the lower flange 20, in a compressed state. An end portion on the upper side of the first elastic member 64 is in contact with the first case-side sealing ring 61. By the elastic restoring force of the first elastic member 64, the first case-side sealing ring 61 is pressed toward the upper side (shaft-side sealing ring 63 side). Accordingly, a pressing force in the axial direction acts between the sealing surfaces 61*a* and 63*a* of the first case-side sealing ring 61 and the shaft-side sealing ring 63.

The second elastic member 65 is inserted into each of a plurality of insertion holes 223 (only one is shown in FIG. 2), which are formed in the circumferential direction in the protrusion 221 of the upper flange 20, in a compressed state. An end portion on the lower side of the second elastic member 65 is in contact with the second case-side sealing ring 62. By the elastic restoring force of the second elastic member 65, the second case-side sealing ring 62 is pressed toward the lower side (shaft-side sealing ring 63 side). Accordingly, a pressing force in the axial direction acts between the sealing surfaces 62*a* and 63*b* of the second case-side sealing ring 62 and the shaft-side sealing ring 63.

When the shaft body 3 rotates relative to the case body 2, the sealing surfaces 63*a* and 63*b* of the shaft-side sealing ring 63 slide while being pressed against the sealing surface 61*a* of the first case-side sealing ring 61 and the sealing surface 62*a* of the second case-side sealing ring 62, respectively. Therefore, the sealing function of the mechanical seal 6 is achieved by the sliding action between the sealing surfaces 61*a* and 63*a* due to the relative rotation of the first case-side sealing ring 61 and the shaft-side sealing ring 63 and the sliding action between the sealing surfaces 62*a* and 63*b* due to the relative rotation of the second case-side sealing ring 62 and the shaft-side sealing ring 63. Hereinafter, the portion where the sealing surfaces 61*a* and 63*a* slide against each other is referred to as sliding portion 66, and the portion where the sealing surfaces 62*a* and 63*b* slide against each other is referred to as sliding portion 67.

<Communication Flow Passages>

As shown in FIG. 1, the rotary joint 1 includes a plurality of communication flow passages 70 formed between the case body 2 and the shaft body 3 by the plurality of mechanical seals 6. The plurality of communication flow passages 70 include a plurality of first communication flow passages 71, a plurality of second communication flow passages 72, and a third communication flow passage 73. The rotary joint 1 of the present embodiment includes a total of eight communication flow passages 70 including four first communication flow passages 71, three second communication flow passages 72, and one third communication flow passage 73.

Each first communication flow passage 71 is a flow passage that connects the first outer flow passage 27A and the first inner flow passage 35A. Each second communication flow passage 72 is a flow passage that connects the second outer flow passage 27B and the second inner flow passage 35B. The third communication flow passage 73 is a flow passage that connects the third outer flow passage 27C and the third inner flow passage 35C.

In FIG. 2 and FIG. 4, the first communication flow passage 71 is formed at a position in the axial direction corresponding to each mechanical seal 6. The first communication flow passage 71 is composed of an outer annular passage 71*a*, a plurality of (four in FIG. 4) through holes 71*b*, and an inner annular passage 71*c*.

The outer annular passage 71*a* of the first communication flow passage 71 is an annular space formed between the protrusions 221 and 221 (211) of the flanges 20 adjacent to each other in the up-down direction, on the radially outer side of the shaft-side sealing ring 63 of each mechanical seal 6. The outer annular passage 71*a* is sealed by the sealing functions of the sliding portions 66 and 67 of each mechanical seal 6 and the sealing functions of the respective O-rings 24 and 68. The outer annular passage 71*a* communicates with the first outer flow passage 27A of the corresponding flange 20 at a predetermined location in the circumferential direction thereon.

The plurality of through holes 71*b* and the inner annular passage 71*c* of the first communication flow passage 71 are formed in the shaft-side sealing ring 63 of each mechanical seal 6. The inner annular passage 71*c* is formed by an annular groove formed on the inner circumference of the shaft-side sealing ring 63 and the outer circumferential surface of the shaft body 3. The inner annular passage 71*c* is sealed by the sealing functions of the pair of upper and lower O-rings 69. The inner annular passage 71*c* communicates with the corresponding first inner flow passage 35A (inclined branch passage portion 371 and extension branch passage portion 372) of the shaft body 3 at predetermined locations in the circumferential direction thereon. The respective through holes 71*b* are formed so as to be spaced apart from each other in the circumferential direction of the shaft-side sealing ring 63 and penetrate the shaft-side sealing ring 63 in the radial direction of the shaft-side sealing ring 63. Each through hole 71*b* connects the outer annular passage 71*a* and the inner annular passage 71*c*.

Due to the above, each first communication flow passage 71 connects the first outer flow passage 27A of the case body 2 and the first inner flow passage 35A of the shaft body 3. The first outer flow passage 27A, the first communication flow passage 71, and the first inner flow passage 35A constitute one independent first fluid passage 11 through which the sealing target fluid flows. Therefore, the rotary joint 1 of the present embodiment includes a plurality of (four in FIG. 1) independent first fluid passages 11 in the axial direction. In each first fluid passage 11 of the present embodiment, the sealing target fluid flows from the first outer flow passage 27A through the first communication flow passage 71 to the first inner flow passage 35A.

In FIG. 2, each second communication flow passage 72 is formed between the shaft-side sealing rings 63 of two mechanical seals 6 adjacent to each other in the up-down direction. The second communication flow passage 72 is composed of an outer annular passage 72*a* and an inner annular passage 72*b*.

The outer annular passage 72*a* of the second communication flow passage 72 is an annular space formed between the second case-side sealing ring 62 of the mechanical seal 6 on the lower side and the first case-side sealing ring 61 of the mechanical seal 6 on the upper side, of the two mechanical seals 6 adjacent to each other in the up-down direction. The outer annular passage 72*a* is sealed by the sealing functions of the O-rings 68 placed on both of the upper and lower sides thereof. The outer annular passage 72*a* communicates with the second outer flow passage 27B of the corresponding flange 20 at a predetermined location in the circumferential direction thereon.

The inner annular passage 72*b* of the second communication flow passage 72 is an annular space formed between the inner circumferential surfaces of the second case-side sealing ring 62 and the first case-side sealing ring 61, which form the outer annular passage 72*a*, and the outer circumferential surface of the shaft body 3. The inner annular passage 72*b* is sealed by the sealing functions of the O-rings 69 placed on both of the upper and lower sides thereof. The inner annular passage 72*b* communicates with the outer annular passage 72*a*. In addition, the inner annular passage 72*b* communicates with the corresponding second inner flow passage 35B (inclined branch passage portion 371 and extension branch passage portion 372) of the shaft body 3 at predetermined locations in the circumferential direction thereon.

Due to the above, each second communication flow passage 72 connects the second outer flow passage 27B of the case body 2 and the second inner flow passage 35B of the shaft body 3. The second outer flow passage 27B, the second communication flow passage 72, and the second inner flow passage 35B constitute one independent second fluid passage 12 through which the sealing target fluid flows. Therefore, the rotary joint 1 of the present embodiment includes a plurality of (three in FIG. 1) independent second fluid passages 12 in the axial direction. In each second fluid passage 12 of the present embodiment, the sealing target fluid flows from the second outer flow passage 27B through the second communication flow passage 72 to the second inner flow passage 35B.

In FIG. 3, the third communication flow passage 73 is formed on the upper side with respect to the shaft-side sealing ring 63 of the mechanical seal 6 located at the uppermost portion. The third communication flow passage 73 is sealed by the sealing functions of the O-rings 68 and 69 placed on the radially outer side and the lower side thereof and the sealing function of the sliding portion 67 of the mechanical seal 6 located at the uppermost portion. The third communication flow passage 73 is composed of an outer annular passage 73*a* and an inner annular passage 73*b*.

The outer annular passage 73*a* of the third communication flow passage 73 is an annular space formed, with an L-shaped cross-section, between the second case-side sealing ring 62 of the mechanical seal 6 located at the uppermost portion and the fourth flow passage flange 22D. The outer annular passage 73*a* communicates with the third outer flow passage 27C of the fourth flow passage flange 22D at a predetermined location in the circumferential direction thereon.

The inner annular passage 73*b* of the third communication flow passage 73 is a space formed between the end surface 31*a* on the upper side of the shaft main body portion 31 and the lower surface of a center portion of the fourth flow passage flange 22D. The inner annular passage 73*b* communicates with the outer annular passage 73*a*. In addition, the inner annular passage 73*b* communicates with the third inner flow passage 35C (inclined branch passage portion 371 and extension branch passage portion 372) of the shaft body 3 at predetermined locations in the circumferential direction thereon.

Due to the above, the third communication flow passage 73 connects the third outer flow passage 27C of the case body 2 and the third inner flow passage 35C of the shaft body 3. The third outer flow passage 27C, the third communication flow passage 73, and the third inner flow passage 35C constitute one independent third fluid passage 13 through which the sealing target fluid flows. Therefore, the rotary joint 1 of the present embodiment includes one independent third fluid passage 13. In the third fluid passage 13 of the present embodiment, the sealing target fluid flows from the third outer flow passage 27C through the third communication flow passage 73 to the third inner flow passage 35C.

Advantageous Effects

In the rotary joint 1 of the first embodiment, each inner flow passage 35 of the shaft body 3 has the plurality of branch passage portions 37 that are open at positions different from each other in the circumferential direction on the outer circumferential side of the shaft body 3. Accordingly, when the shaft body 3 rotates relative to the case body 2, the angle α in the circumferential direction between the opening closest in the circumferential direction from the opening 271 of the outer flow passage 27 on the inner circumferential side of the case body 2, among the plurality of openings 371*a* (371*b*) and 374*a* of each inner flow passage 35 (branch passage portions 37) on the outer circumferential side of the shaft body 3, and the opening 271 of the outer flow passage 27 is less than 180° at most.

Accordingly, the distance by which the sealing target fluid flows in the circumferential direction in the communication flow passage 70 between the inner flow passage 35 and the outer flow passage 27 becomes shorter than in the conventional rotary joint, so that the pressure loss of the sealing target fluid due to the rotation of the shaft body 3 can be reduced. Furthermore, in the inner flow passage 35, the plurality of branch passage portions 37 merge with the merging end portion 36*a* of the main passage portion 36, so that the flow passage resistance at the merging end portion 36*a* can be reduced to be lower than the flow passage resistance at the bent portion having an L-shaped cross-section in the conventional inner flow passage.

Due to the above, the rotary joint 1 of the present embodiment can effectively reduce the pressure loss of the sealing target fluid compared to the conventional rotary joint. In particular, when increasing the number of inner flow passages 35 without changing the outer diameter of the shaft body 3, it is necessary to reduce the flow passage diameter of each inner flow passage 35. However, as the flow passage diameter decreases, the flow passage resistance of each inner flow passage 35 increased. Therefore, it is more effective to apply the rotary joint 1 of the present disclosure to such a case.

The branch passage portions 37 of each inner flow passage 35 include the inclined branch passage portion 371 that extends in a direction that forms an acute angle with the axial direction toward the upper side, from the main passage portion 36 to the outer circumferential side of the shaft body 3. Therefore, the inclined branch passage portion 371 merges more gently with the merging end portion 36*a* of the main passage portion 36 than the first branch passage portion 376 (second branch passage portion 377) of the second embodiment (FIG. 7) described later. Accordingly, the flow passage resistance at the merging end portion 36*a* of the main passage portion 36 is reduced, so that the pressure loss of the sealing target fluid can be further effectively reduced.

The branch passage portions 37 of each inner flow passage 35 include the extension branch passage portion 372 having the extension portion 373 or 375 that extends in the axial direction from the main passage portion 36 toward the upper side. Therefore, the angle between the inclined branch passage portion 371 and the extension branch passage portion 372 (extension portion 373 or 375) becomes acute and is smaller than the angle (180°) between the first branch passage portion 376 and the second branch passage portion 377 of the second embodiment (FIG. 7) described later. Accordingly, the flow passage resistance at the merging end portion 36*a* of the main passage portion 36 where the inclined branch passage portion 371 and the extension branch passage portion 372 merge is reduced, so that the pressure loss of the sealing target fluid can be further effectively reduced. In particular, when the sealing target fluid flows from each of the inclined branch passage portion 371 and the extension branch passage portion 372 toward the main passage portion 36, the sealing target fluid smoothly flows toward the lower side at the merging end portion 36*a* of the main passage portion 36, so that the flow passage resistance at the merging end portion 36*a* can be effectively reduced.

Each extension branch passage portion 372 of the first inner flow passages 35A and the second inner flow passages 35B further has the inclined portion 374 that extends in a direction that forms an acute angle with the axial direction toward the upper side, from the extension portion 373 to the outer circumferential surface of the shaft body 3. Therefore, the extension branch passage portion 372 is gently bent by the inclined portion 374. Accordingly, the flow passage resistance of the extension branch passage portion 372 is reduced compared to the case where the extension branch passage portion 372 is bent perpendicularly in the radial direction from the end portion on the upper side of the extension portion 373, so that the pressure loss of the sealing target fluid can be further effectively reduced.

The inclined branch passage portion 371 and the extension branch passage portion 372 of each inner flow passage 35 are open at an interval of 180° in the circumferential direction on the outer circumferential side of the shaft body 3. Accordingly, when the shaft body 3 rotates relative to the case body 2, the angle α in the circumferential direction between the opening closer in the circumferential direction from the opening 271 of the outer flow passage 27 on the inner circumferential side of the case body 2, of the two openings 371*a* (371*b*) and 374*a* of the inclined branch passage portion 371 and the extension branch passage portion 372 on the outer circumferential side of the shaft body 3, and the opening 271 of the outer flow passage 27 is at most 90°. Therefore, the distance by which the sealing target fluid flows in the circumferential direction in the communication flow passage 70 between the inner flow passage 35 and the outer flow passage 27 is further shortened, so that the pressure loss of the sealing target fluid due to the rotation of the shaft body 3 can be further reduced.

Modification

In the rotary joint 1 of the first embodiment, each inner flow passage 35 of the shaft body 3 has the inclined branch passage portion 371 and the extension branch passage portion 372 as the plurality of branch passage portions 37, but all the branch passage portions 37 may be inclined branch passage portions 371.

Second Embodiment

Figure 6:
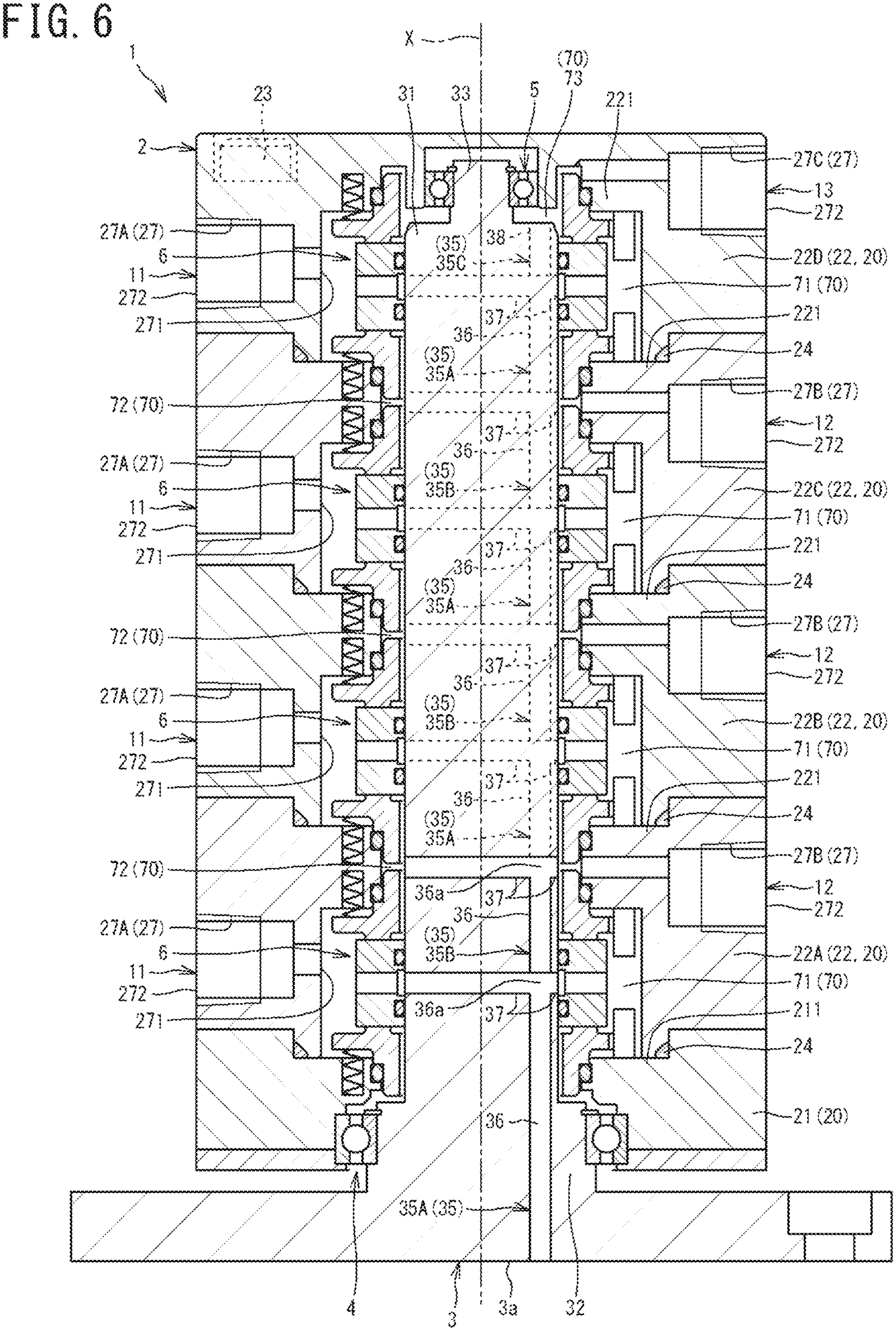
FIG. 6 is a cross-sectional view showing a rotary joint according to a second embodiment of the present disclosure.
Figure 7:
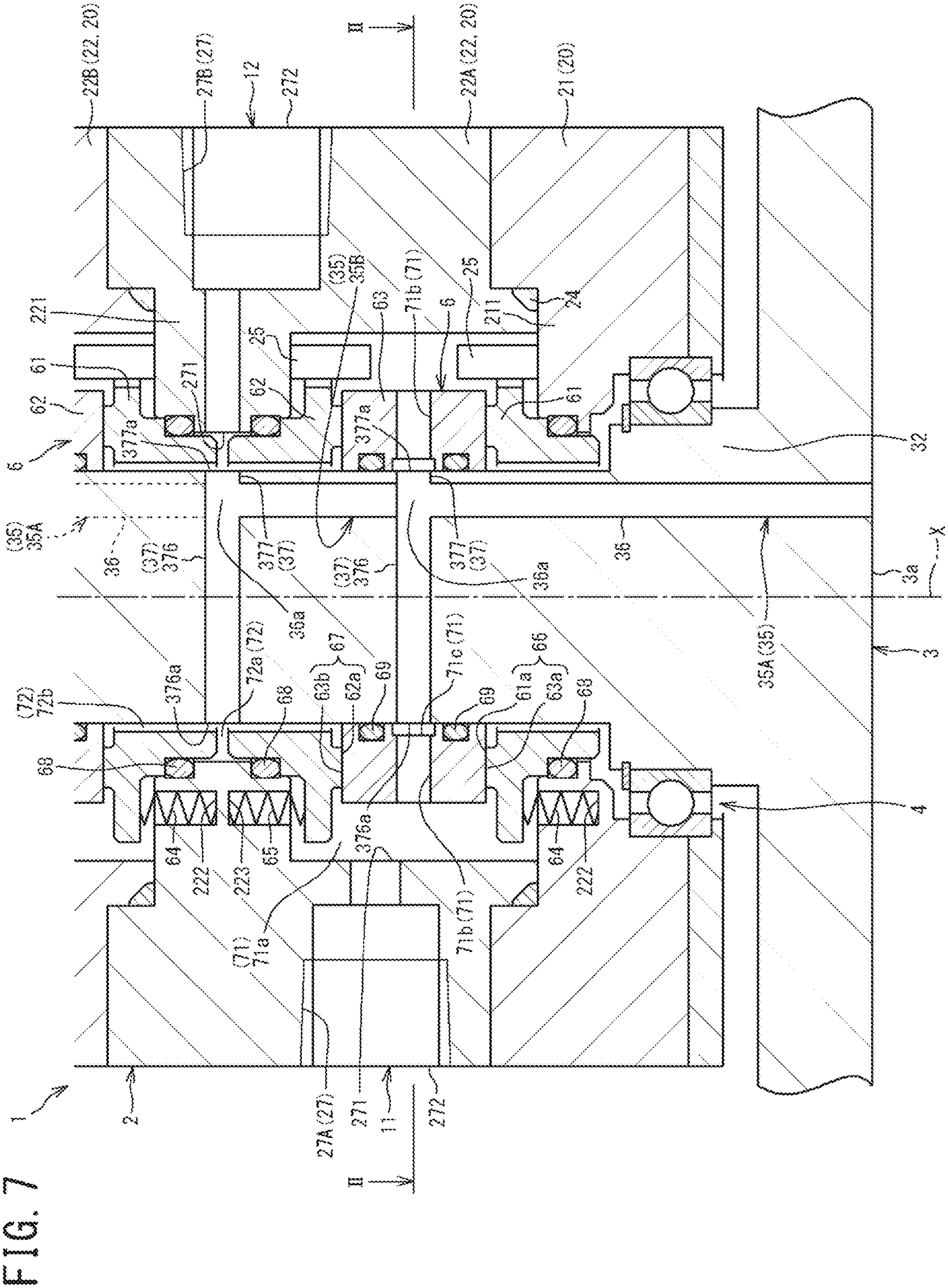
FIG. 7 is an enlarged cross-sectional view showing the lower side of the rotary joint in FIG. 6.

FIG. 6 is a cross-sectional view showing a rotary joint 1 according to the second embodiment of the present disclosure. FIG. 7 is an enlarged cross-sectional view showing the lower side of the rotary joint 1 of the present embodiment. The rotary joint 1 of the second embodiment is different from the first embodiment in the configuration of each inner flow passage 35 of the shaft body 3.

<First Inner Flow Passage and Second Inner Flow Passage>

In FIG. 6 and FIG. 7, each of the first inner flow passages 35A and the second inner flow passages 35B of the present embodiment has a main passage portion 36 and a plurality of (two in FIG. 6) branch passage portions 37. The merging end portion 36*a* of the main passage portion 36 extends to the same position in the axial direction as the opening 271 of the corresponding outer flow passage 27. The plurality of branch passage portions 37 include a first branch passage portion 376 and a second branch passage portion 377. The first branch passage portion 376 and the second branch passage portion 377 have the same flow passage cross-sectional area as the main passage portion 36. At least one of the first branch passage portion 376 and the second branch passage portion 377 may have a flow passage cross-sectional area different from that of the main passage portion 36.

Figure 8:
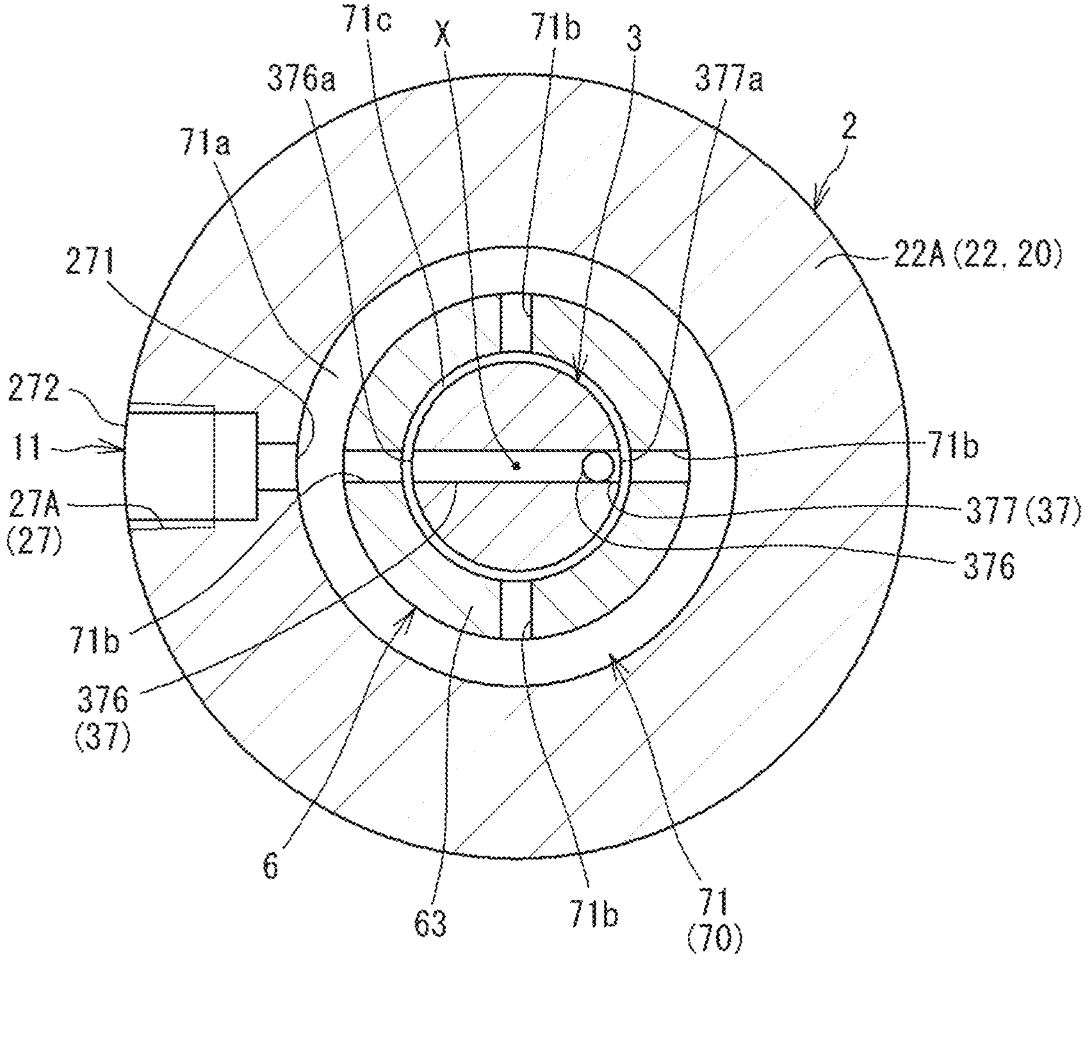
FIG. 8 is a cross-sectional view as seen in the direction of arrows II-II in FIG. 7.

FIG. 8 is a cross-sectional view as seen in the direction of arrows II-II in FIG. 7. In FIG. 7 and FIG. 8, the first branch passage portion 376 and the second branch passage portion 377 extend radially outward from the merging end portion 36*a* of the main passage portion 36 to the outer circumferential side of the shaft body 3. The first branch passage portion 376 and the second branch passage portion 377 are open so as to be spaced apart from each other in the circumferential direction, on the outer circumferential side of the shaft body 3.

The first branch passage portion 376 and the second branch passage portion 377 of the present embodiment are open so as to be spaced apart from each other by 180° in the circumferential direction, on the outer circumferential surface of the shaft body 3 which is the outer circumferential side of the shaft body 3. That is, the first branch passage portion 376 and the second branch passage portion 377 extend in directions opposite to each other, from the merging end portion 36*a* of the main passage portion 36, and the angle therebetween in a cross-sectional view in the axial direction (FIG. 7) is 180°. The first branch passage portion 376 and the second branch passage portion 377 are formed perpendicular to the main passage portion 36. Therefore, the inner flow passages 35 of the present embodiment are formed in a T-shape in a cross-sectional view in the axial direction (FIG. 7). An opening 376*a* of the first branch passage portion 376 and an opening 377*a* of the second branch passage portion 377 on the outer circumferential surface of the shaft body 3 are located in the same position in the axial direction as the opening 271 of the corresponding outer flow passage 27.

The angles α1 and α2 related to the branch passage portions 37 of each first inner flow passage 35A (second inner flow passage 35B) of the present embodiment are the same when the openings 371*a* and 374*a* of the branch passage portions 37 of the first embodiment (see FIG. 5) are replaced with the openings 376*a* and 377*a* of the branch passage portions 37 of the present embodiment, and thus the description thereof is omitted.

<Third Inner Flow Passage>

Figure 9:
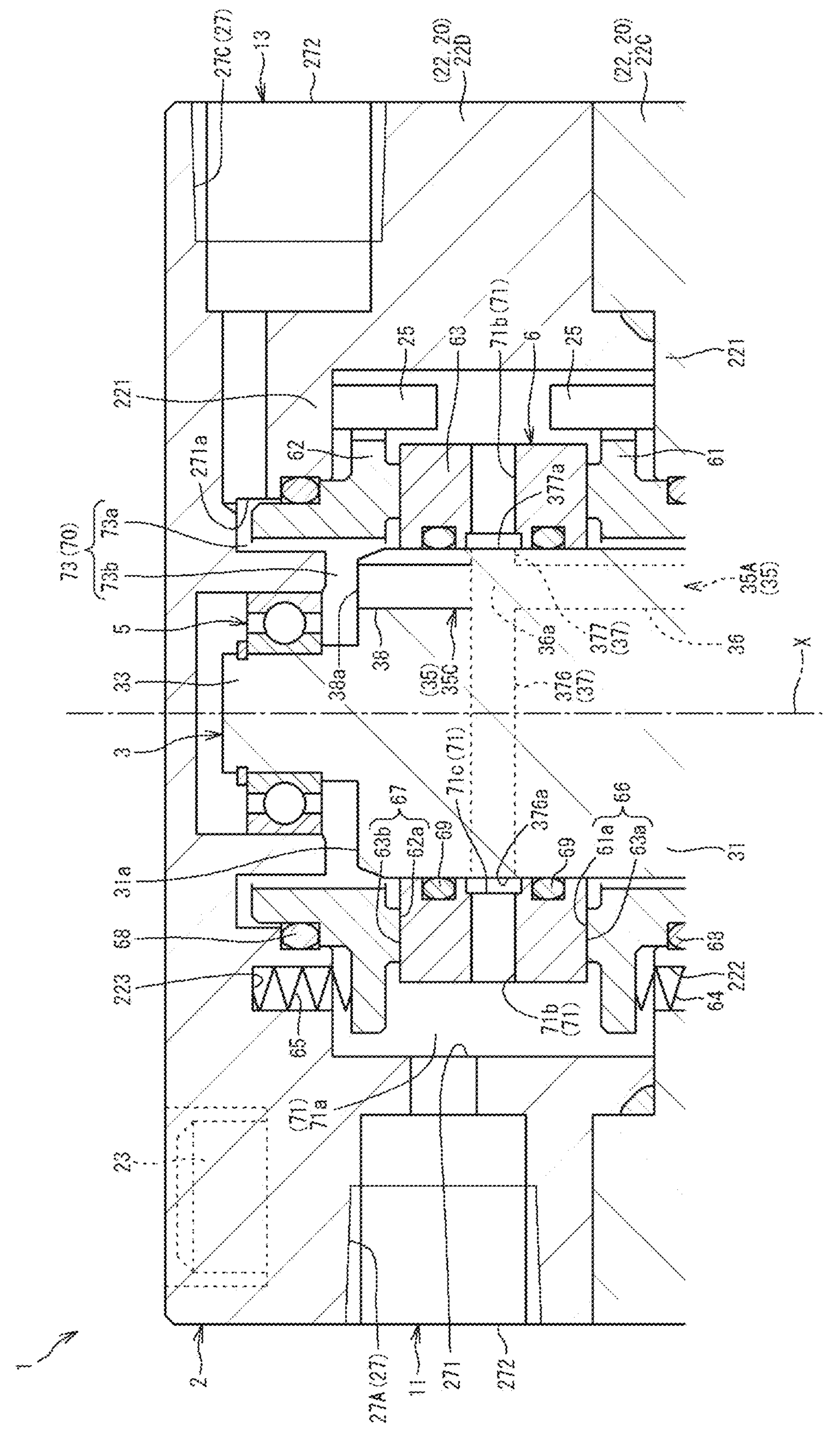
FIG. 9 is an enlarged cross-sectional view showing the upper side of the rotary joint in FIG. 6.

FIG. 9 is an enlarged cross-sectional view showing the upper side of the rotary joint 1 of the present embodiment. In FIG. 6 and FIG. 9, a third inner flow passage 35C of the present embodiment has a main passage portion 38 only. The main passage portion 38 extends straight in the axial direction from the end surface 3*a* on the lower side of the shaft body 3 toward the upper side.

One end of the main passage portion 38 is open on the end surface 3*a* on the lower side of the shaft body 3. The pipe of the rotary-side member is connected to the opening on the lower side of the main passage portion 38. The other end of the main passage portion 38 is open on the end surface 31*a* on the upper side of the shaft main body portion 31, and an opening 38*a* thereof communicates with the third communication flow passage 73.

The other components of the present embodiment are the same as those of the first embodiment, and thus are designated by the same reference signs, and the description thereof is omitted.

Advantageous Effects

In the rotary joint 1 of the second embodiment, each inner flow passage 35 (other than the third inner flow passage 35C) of the shaft body 3 has the plurality of branch passage portions 37 that are open at positions different from each other in the circumferential direction, on the outer circumferential surface of the shaft body 3. Accordingly, as in the first embodiment, the pressure loss of the sealing target fluid can be effectively reduced compared to the conventional rotary joint.

The branch passage portions 37 of each inner flow passage 35 include the first branch passage portion 376 and the second branch passage portion 377 that extend radially outward of the shaft body 3 from the main passage portion 36 to the outer circumferential surface of the shaft body 3. Accordingly, the first branch passage portion 376 and the second branch passage portion 377 are formed perpendicular to the main passage portion 36 extending in the axial direction, so that the first branch passage portion 376 and the second branch passage portion 377 can be formed more easily than the inclined branch passage portion 371 of the first embodiment (FIG. 1).

The first branch passage portion 376 and the second branch passage portion 377 of each inner flow passage 35 are open at an interval of 180° in the circumferential direction, on the outer circumferential surface of the shaft body 3. Accordingly, when the shaft body 3 rotates relative to the case body 2, the angle α in the circumferential direction between the opening closest in the circumferential direction from the opening 271 of the outer flow passage 27 on the inner circumferential surface of the case body 2, of the two openings 376*a* and 377*a* of the first branch passage portion 376 and the second branch passage portion 377 on the outer circumferential surface of the shaft body 3, and the opening 271 of the outer flow passage 27 is at most 90°. Therefore, the distance by which the sealing target fluid flows in the circumferential direction in the communication flow passage 70 between the inner flow passage 35 and the outer flow passage 27 becomes shorter than in the conventional rotary joint, so that the pressure loss of the sealing target fluid due to the rotation of the shaft body 3 can be further reduced.

[Effect Confirmation Test]

The inventor of the present application performed analysis by simulation using fluid analysis software, as a test for confirming the effects of the rotary joints of the first embodiment and the second embodiment. In this test, the analysis was performed for a total of four types of rotary joints that were the conventional rotary joint, the rotary joint of the first embodiment, the rotary joint of the above modification (in which all the branch passage portions 37 are inclined branch passage portions 371), and the rotary joint of the second embodiment.

Specifically, through the simulation, in a state where the flow rate of the sealing target fluid flowing in through the inlet (opening 272 on the outer circumferential side of the outer flow passage 27) of each rotary joint was kept constant, the pressure difference of the sealing target fluid between the inlet and the outlet (opening of the inner flow passage 35 on the end surface 3*a* of the shaft body 3) of the rotary joint 1 was calculated. The smaller the pressure difference is, the more the pressure loss of the sealing target fluid is reduced.

In this test, after the pressure difference was calculated for each of the four types, the ratio of the pressure difference of the rotary joint of each embodiment (modification) to the pressure difference of the conventional rotary joint was calculated. This ratio indicates the extent to which the pressure loss of the sealing target fluid in the rotary joint of each embodiment (modification) is reduced compared to the conventional rotary joint, that is, the degree of improvement in pressure loss reduction. The larger the ratio is, the more effectively the pressure loss of the sealing target fluid is reduced. Table 1 below shows the analysis results of the simulation in this test.

TABLE 1

| | First embodiment | Modification of first embodiment | Second embodiment |
|---|---|---|---|
| Ratio indicating degree of improvement (%) | 55.5 | 53.2 | 40.5 |

As shown in Table 1, it was confirmed that the pressure loss of the sealing target fluid could be reduced in the order of the rotary joint of the first embodiment, the rotary joint of the modification of the first embodiment, and the rotary joint of the second embodiment.

Reference Example

Figure 10:
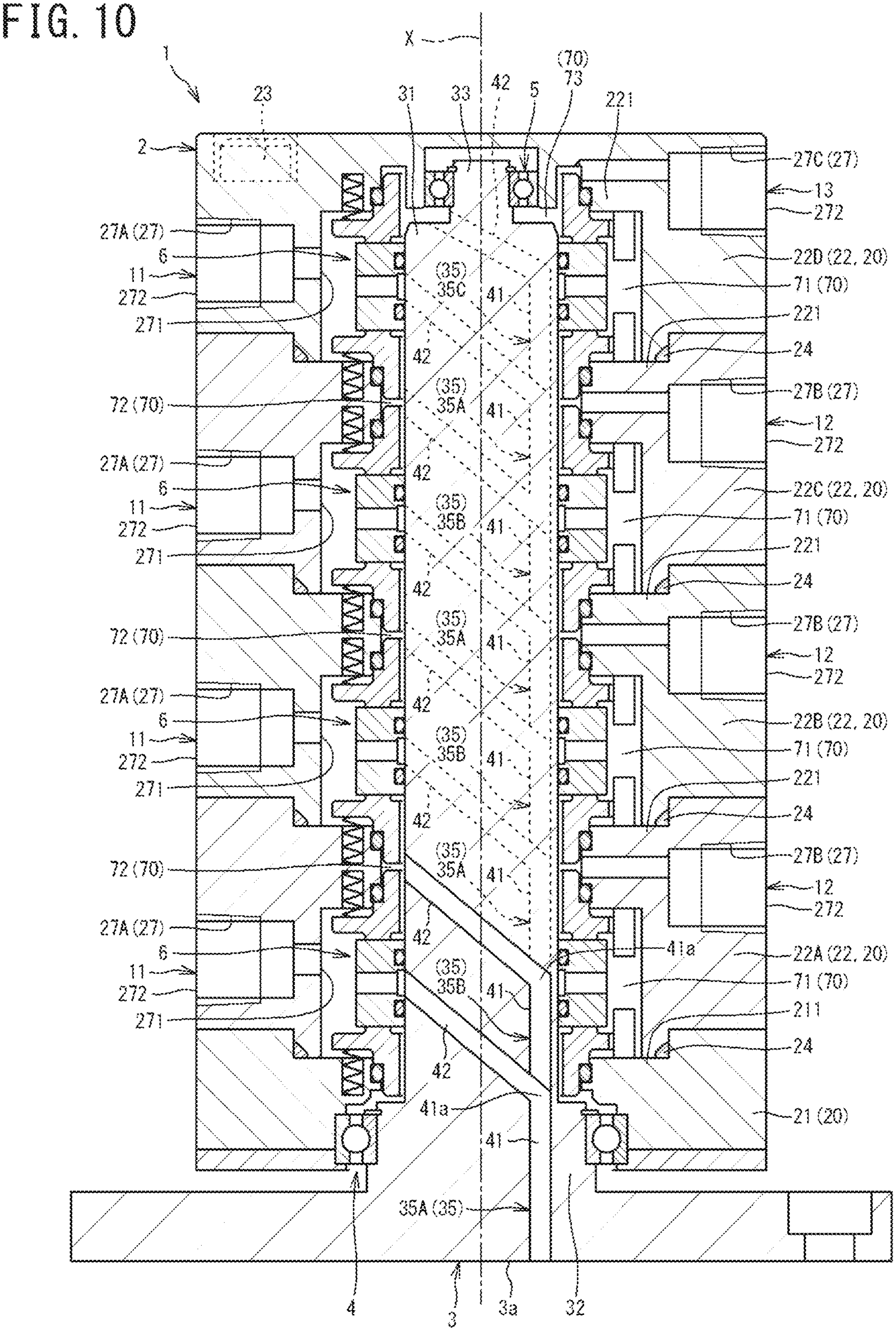
FIG. 10 is a cross-sectional view showing a rotary joint as a reference example.
Figure 11:
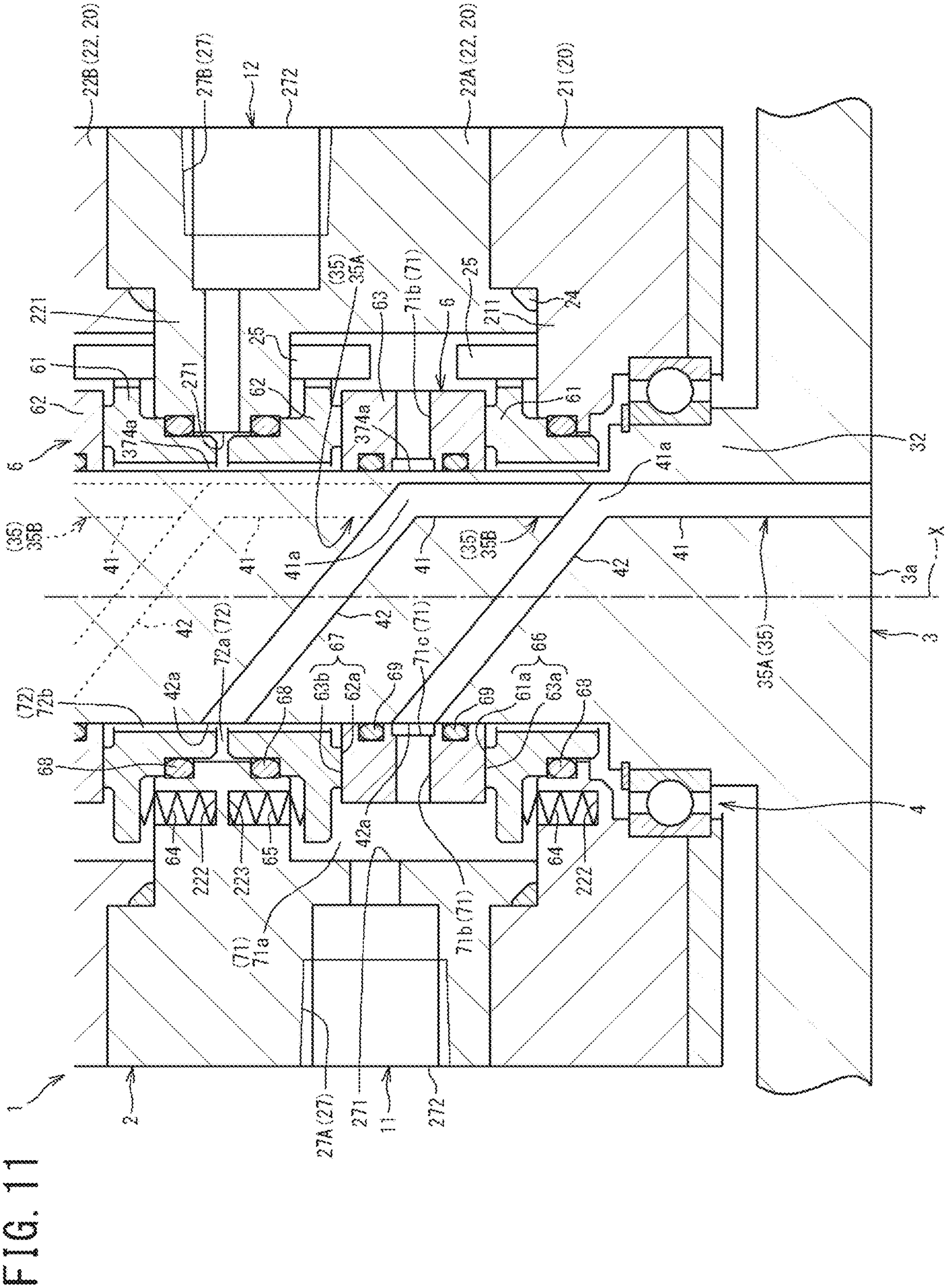
FIG. 11 is an enlarged cross-sectional view showing the lower side of the rotary joint in FIG. 10.

FIG. 10 is a cross-sectional view showing a rotary joint 1 as a reference example. FIG. 11 is an enlarged cross-sectional view showing the lower side of the rotary joint 1 of this reference example. The rotary joint 1 of this reference example is different from the first embodiment in the configuration of each inner flow passage 35 of the shaft body 3. In FIG. 10 and FIG. 11, each inner flow passage 35 of this reference example has a single main passage portion 41 and a single inclined passage portion 42.

The main passage portion 41 extends straight in the axial direction from the end surface 3*a* on the lower side of the shaft body 3 toward the upper side. The main passage portion 41 is open on the end surface 3*a* on the lower side of the shaft body 3. The pipe of the rotary-side member is connected to the opening on the lower side of the main passage portion 41. A passage end portion 41*a* on the upper side of the main passage portion 41 is located slightly lower in the axial direction than the opening 271 of the corresponding outer flow passage 27.

The inclined passage portion 42 extends obliquely in a direction that forms an acute angle with the axial direction toward the upper side (in FIG. 10, obliquely upward to the left) from the passage end portion 41*a* on the upper side of the main passage portion 41 to the outer circumferential side of the shaft body 3. The inclined passage portion 42 of this reference example is inclined upward at about 50° with respect to the axial direction from the passage end portion 41*a* on the upper side of the main passage portion 41. The inclined passage portion 42 has the same flow passage cross-sectional area as the main passage portion 41. The inclined passage portion 42 may have a flow passage cross-sectional area different from that of the main passage portion 41.

Each inclined passage portion 42 of the first inner flow passages 35A and the second inner flow passages 35B is open at a predetermined location in the circumferential direction on the outer circumferential surface of the shaft body 3 which is the outer circumferential side of the shaft body 3, and an opening 42*a* thereof is located at the same position in the axial direction as the opening 271 of the corresponding outer flow passage 27. The opening 42*a* of each inclined passage portion 42 communicates with the corresponding first communication flow passage 71 or second communication flow passage 72.

Figure 12:
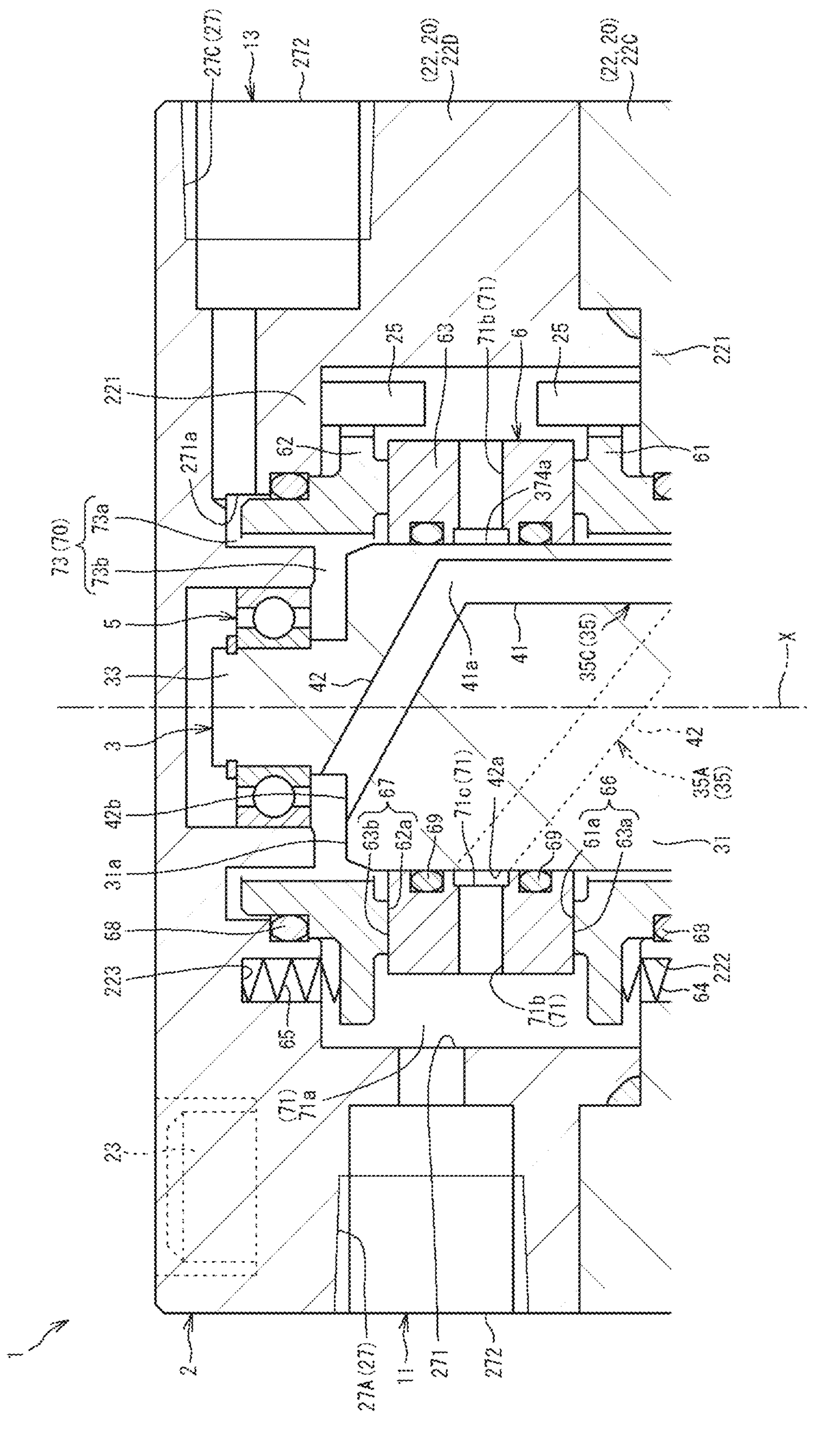
FIG. 12 is an enlarged cross-sectional view showing the upper side of the rotary joint in FIG. 10.

FIG. 12 is an enlarged cross-sectional view showing the upper side of the rotary joint 1 of this reference example. As shown in FIG. 12, the inclined passage portion 42 of the third inner flow passage 35C is open at a corner portion between the shaft main body portion 31 and the small-diameter portion 33 on the outer circumferential side of the shaft body 3, and an opening 42*b* thereof communicates with the third communication flow passage 73.

The other components of this reference example are the same as those of the first embodiment, and thus are designated by the same reference signs, and the description thereof is omitted.

In the rotary joint 1 of this reference example, the inclined passage portion 42 of each inner flow passage 35 extends in a direction that forms an acute angle with the axial direction toward the upper side, from the main passage portion 41 to the outer circumferential side of the shaft body 3. Accordingly, the bent portion between the main passage portion 41 and the inclined passage portion 42 is more gently bent than the bent portion having an L-shaped cross-section in the conventional inner flow passage. As a result, the flow passage resistance at the bent portion between the main passage portion 41 and the inclined passage portion 42 is reduced, so that the pressure loss of the sealing target fluid can be effectively reduced.

[Others]

The rotary joint 1 of each embodiment described above may be placed so as to be upside down in the axial direction or may be placed such that the axial direction is horizontal. In addition, the rotary joint 1 can also be applied to other apparatuses such as a sputtering apparatus and an etching apparatus in addition to the CMP apparatus. Moreover, the rotary joint 1 is not limited to use in the semiconductor field. Furthermore, in the rotary joint 1, the communication flow passages 70 are formed by the mechanical seals 6, but the communication flow passages 70 may be formed by other sealing materials (e.g., X-rings or lip seals).

In each embodiment described above, the shaft body 3 rotates relative to the case body 2, but the case body 2 may be rotated relative to the fixed shaft body 3. In each embodiment described above, the sealing target fluid flows in the direction from the outer flow passage 27 of the case body 2 toward the inner flow passage 35 of the shaft body 3, but the sealing target fluid may flow in the opposite direction. Each inner flow passage 35 of each embodiment described above may include three or more branch passage portions 37.

Each extension branch passage portion 372 of the first embodiment has the inclined portion 374 that extends obliquely in a direction that forms an acute angle with the axial direction from the end portion on the upper side of the extension portion 373, but may be formed so as to perpendicularly extend radially outward from the end portion on the upper side of the extension portion 373 to the outer circumferential side of the shaft body 3.

Each inclined branch passage portion 371 and each extension branch passage portion 372 of the first embodiment are formed at an interval of 180° in the circumferential direction, but are not limited thereto, and may be formed, for example, at an interval of an acute angle or 90° in the circumferential direction. Similarly, each first branch passage portion 376 and each second branch passage portion 377 of the second embodiment are formed at an interval of 180° in the circumferential direction, but are not limited thereto, and may be formed, for example, at an interval of an acute angle or 90° in the circumferential direction.

Of the first embodiment and the second embodiment, at least a part of one embodiment may be combined with at least a part of the other embodiment as desired. For example, the plurality of branch passage portions 37 of the first embodiment may include at least one of the first branch passage portion 376 and the second branch passage portion 377 of the second embodiment in addition to the inclined branch passage portion 371 and the extension branch passage portion 372. Similarly, the plurality of branch passage portions 37 of the second embodiment may include at least one of the inclined branch passage portion 371 and the extension branch passage portion 372 of the first embodiment in addition to the first branch passage portion 376 and the second branch passage portion 377.

The embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST

1 rotary joint
2 case body
3 shaft body
27 outer flow passage
35 inner flow passage
36 main passage portion
**36*a*** merging end portion
37 branch passage portion
70 communication flow passage
371 inclined branch passage portion
372 extension branch passage portion
373, 375 extension portion
374 inclined portion
376 first branch passage portion
377 second branch passage portion

The invention claimed is:

1. A rotary joint comprising:

a tubular case body including an outer flow passage through which a sealing target fluid flows, wherein
the outer flow passage is open on an inner circumferential side of the tubular case body;

a shaft body including an inner flow passage through which the sealing target fluid flows, wherein
the inner flow passage is open on an outer circumferential side of the shaft body, and
the shaft body is disposed inside the tubular case body and is configured to rotate; and a communication flow passage connecting the outer flow passage and the inner flow passage, wherein the inner flow passage comprises:
branch passage portions being open at positions different from each other in a circumferential direction of the shaft body on the outer circumferential side of the shaft body, and
a main passage portion extending in an axial direction of the shaft body from a surface at a first end of the shaft body in the axial direction to a merging end portion where the plurality of branch passage portions merge, and each of the branch passage portions comprises:
an inclined branch passage portion extending from the merging end portion of the main passage portion to the outer circumferential side of the shaft body, wherein
the inclined branch passage portion extends in a direction that forms an acute angle with the axial direction toward a second end of the shaft body in the axial direction; and
an extension branch passage portion comprising:
an extension portion extending in the axial direction from the merging end portion of the main passage portion toward the second end in the axial direction, and
an inclined portion extending from an end of the extension portion away from the merging end portion of the main passage portion to the outer circumferential side of the shaft body, wherein
the inclined portion extends in a direction that forms an acute angle with the axial direction toward the second end in the axial direction.

2. The rotary joint according to claim 1, wherein the inclined branch passage portion and the extension branch passage portion are open on the outer circumferential side of the shaft body at positions spaced apart from each other by 180° in the circumferential direction.

* * * * *